March 8, 1966 G. R. COGAR ETAL 3,239,809
SKEW CORRECTION BUFFER
Filed May 22, 1962 5 Sheets-Sheet 1

INVENTORS
GEORGE R. COGAR
MARY ANNE BRESLIN
WILLIAM F. SCHMITT
BY Griffin and Stokes
ATTORNEYS March 8, 1966 G. R. COGAR ETAL 3,239,809

SKEW CORRECTION BUFFER

Filed May 22, 1962 5 Sheets-Sheet 3

United States Patent Office 3,239,809

Patented Mar. 8, 1966

3,239,809

SKEW CORRECTION BUFFER

George R. Cogar, Norwalk, Conn., and Mary Anne Breslin, Philadelphia, and William F. Schmitt, Wayne, Pa., assignors to Sperry Rand Corporation, New York, N.Y., a corporation of Delaware Filed May 22, 1962, Ser. No. 196,635
28 Claims. (Cl. 340—146.1)

The present invention relates to data translating apparatus and is more particularly concerned with an improved apparatus for the synchronization and realignment of signal pulses received or sent from a multichannel storage tape apparatus or in other forms of multichannel transmission systems.

Information is often recorded on webs or tapes, thereby to provide temporary or permanent storage of the said information. Such information may, for instance, be recorded as magnetized spots, as holes in a web, or as optically observable marks; and in the process of recording, the web or tape is caused to pass adjacent a recording transducer whereby the transducer impresses the desired information on the web.

In many forms of information systems, this recording of information is accomplished in plural channels on the tape or web, and one of the major problems present in such a plural channel recording system is the maintenance of a constant spatial relationship between the recorded pulses. One method of achieving this constant spatial relationship is to utilize a multiple channel head comprising a plurality of spaced individual transducers in conjunction with a recording medium such as a magnetic tape; and such as an overall recording system is capable of high speeds of operation while satisfying the requirement of constant spatial relationship between pulses.

When such a multichannel recording system is employed, a further problem is ordinarily presented, and this further problem comprises the maintenance of a constant relationship between the multichannel head and the tape itself. In recording systems of the type described, the storage member or tape is ordinarily caused to pass between guides adjacent the opposed sides of a recording head or transducer; and these guides function to assure, as nearly as possible, a predetermined positional relationship between the transducer and tape during the recording or reproducing step. In practice, however, it has been found that due to variation of tape width during manufacture, or due to wear on the tape guides, to warp and camber of the tape, and/or to distortion of the tape edge or guides, it is extremely difficult to achieve a perfectly constant spatial relationship between the tape and transducer. Inasmuch as the guides must be set to accommodate the greatest possible width of tape so that binding of the tape in the guides will not occur, the tape may be subject to some angular variation in the guides as it passes adjacent to the transducer. This possible angular variation of the tape relative to a recording or reproducing transducer is commonly known as tape "skew," and such skew may in fact be cumulative between an original recording operation and a subsequent reproducing operation, or when a tape recorded on one machine is read on another machine. Such skew, of course, poses one of the major difficulties encountered in multichannel systems of the type described, in that time misalignment of the plural recording or reproducing channels can occur; and the way in which this time misalignment may in fact occur cannot be predicted and will not be repeated from pass to pass.

Since presently known tapes and magnetic heads permit the recording of tape frames less than 0.001 inch apart, the probability of tape skew is considerable. The prior art skew correcting systems in general have solved the problem by providing one or more buffer registers for each of the parallel tape tracks or channels, with each buffer register being adapted to store bits of successive tape frames the number of which depends upon the maximum amount of skew anticipated. However, the present invention employs an entirely different principle which permits it to provide a number of registers dependent only upon the maximum amount of skew anticipated and not upon the number of tape channels to be read. Instead, each such register has storage capacity for a complete tape frame so that the register size is dependent upon the number of tape channels. As an example, the embodiment of the invention shown here requires only four buffer registers since only four frames of skew are ever anticipated. This is a normal amount of skew in a high speed system. Each register herein contains nine bit storage positions since the particular tape being read has nine parallel longitudinal tape channels for recording successive nine-bit data frames. Thus, the present invention provides structure which is distinctly different in organization and operation from that shown by the prior art. Furthermore, each reassembled data frame is always read from the same buffer register which thus eliminates complex gating circuitry between the deskewing circuit and the utilization circuits.

It is therefore an object of the present invention to provide a deskewing circuit having a number of buffer registers dependent upon the maximum frames of skew expected.

Another object of the present invention is to provide a deskewing circuit containing a number of buffer registers each capable of holding an entire reassembled data frame.

A further object of the present invention is to provide deskewing circuits responsive to initially recorded start pattern bits for conditioning the circuits to receive and correctly reassemble the skewed data frames.

Yet another object of the present invention is to provide means for indicating an overskew condition when the amount of frame skew exceeds the number of buffer registers provided.

A still further object of the present invention is to provide gating circuitry responsive to read-in "spots" within the buffer registers themselves in order to determine into which buffer register a data bit is to be placed.

Another object of the present invention is to provide a deskewing circuit having a number of registers from only one of which the complete reassembled data frame is read to the utilization circuits.

Still another object of this invention is to provide a control register of the same capacity as the buffer frame registers in order to aid in sequencing the deskew circuits through the proper steps.

These and other objects of the present invention will become apparent during the course of the following description of a preferred embodiment, which is to be read in conjunction with the drawings, in which.

Figure 5A:
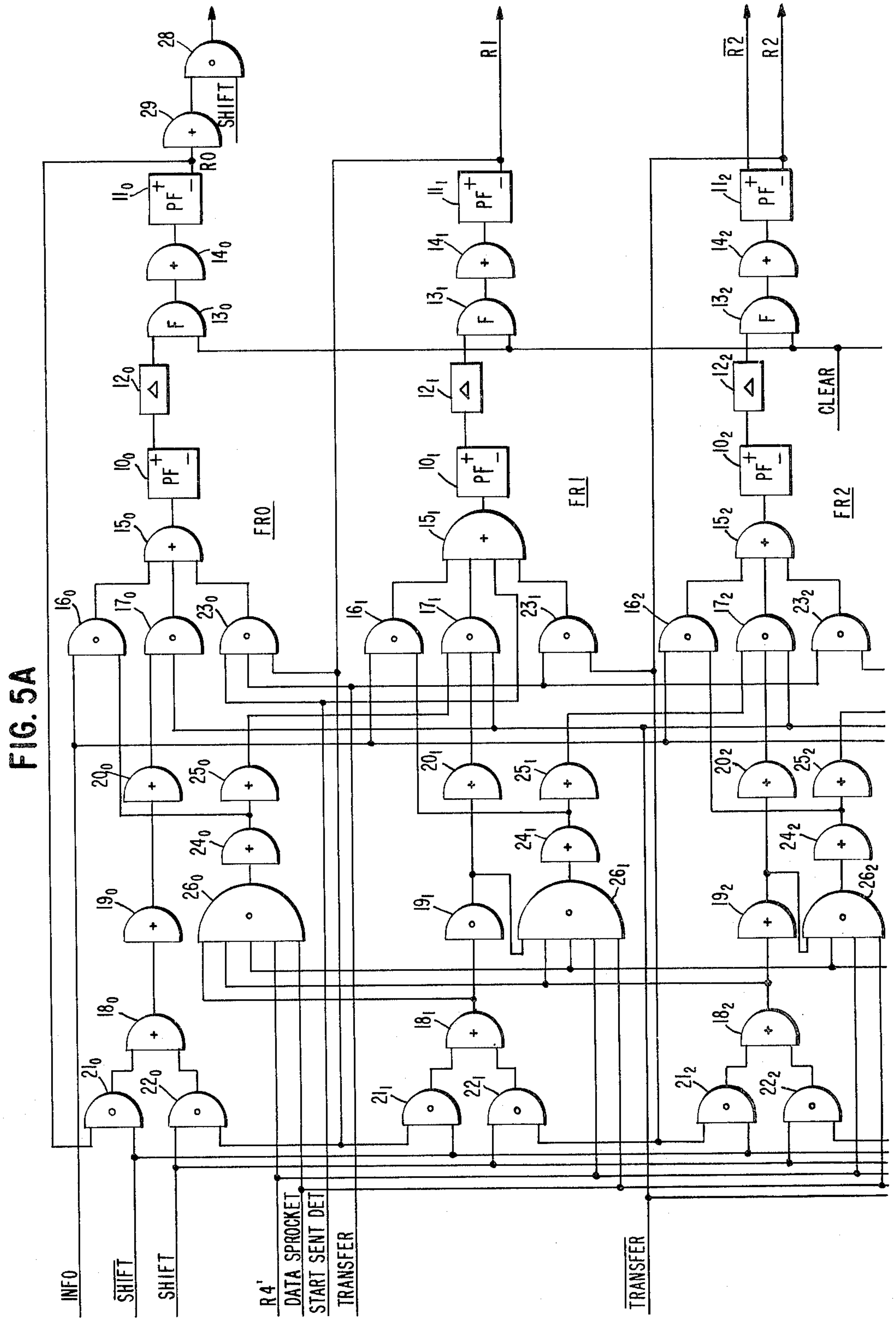
Figure 5B:
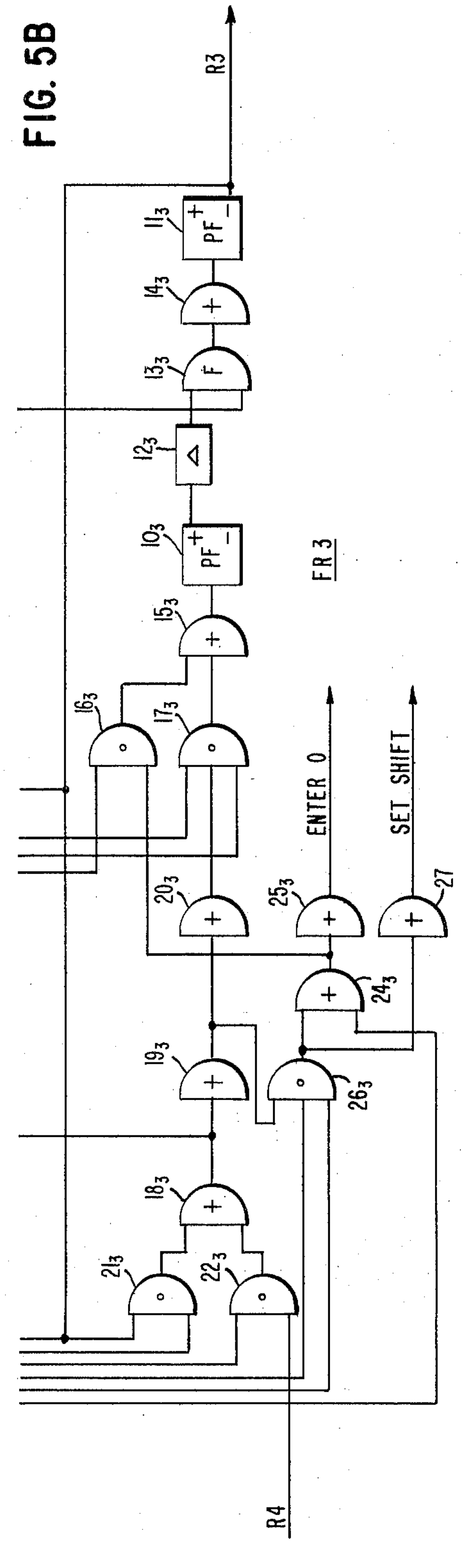
Figure 6:
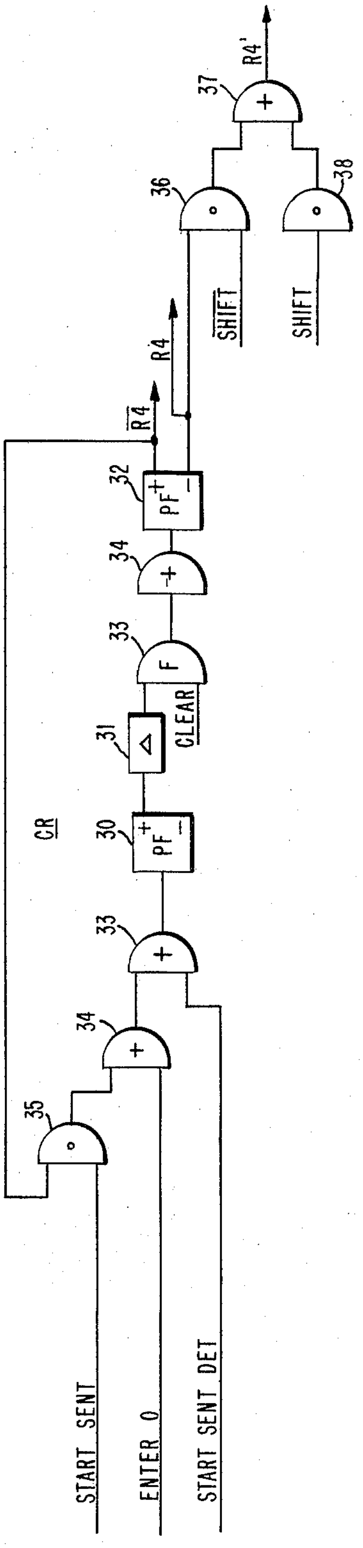
Figure 7:
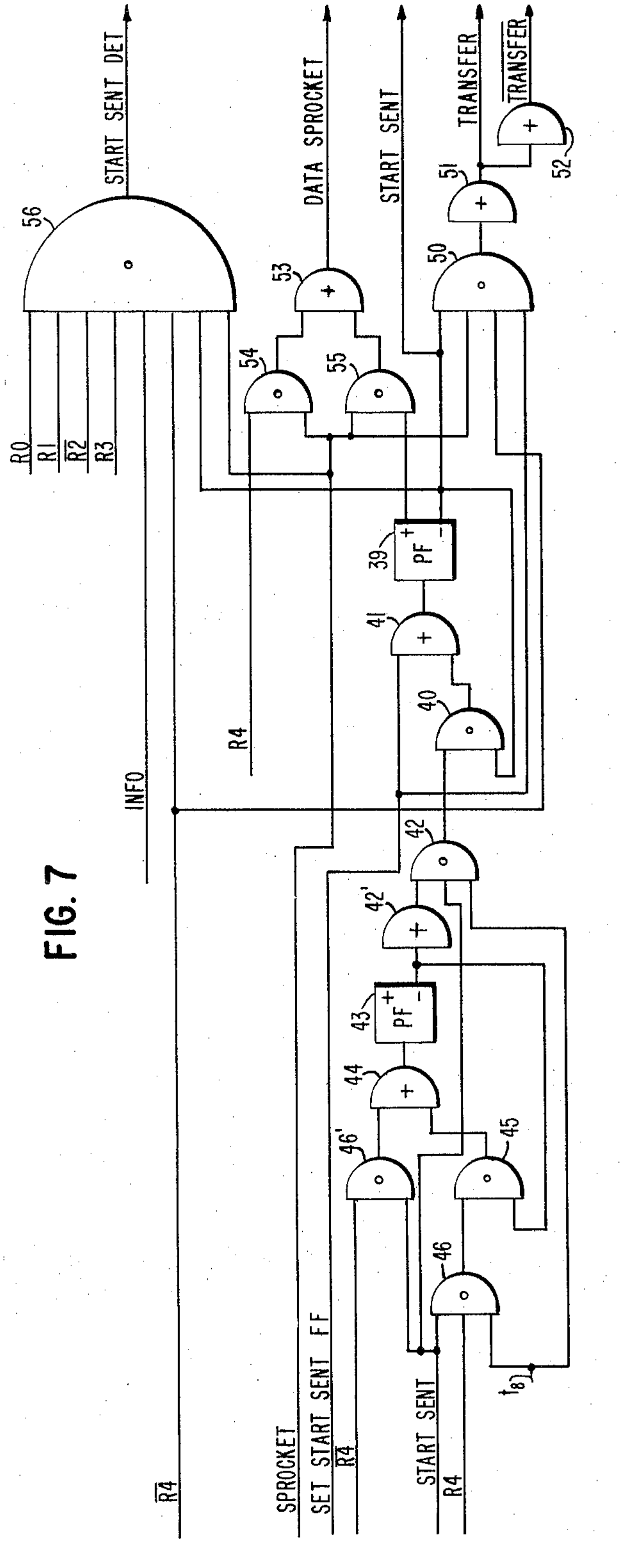
Figure 8:
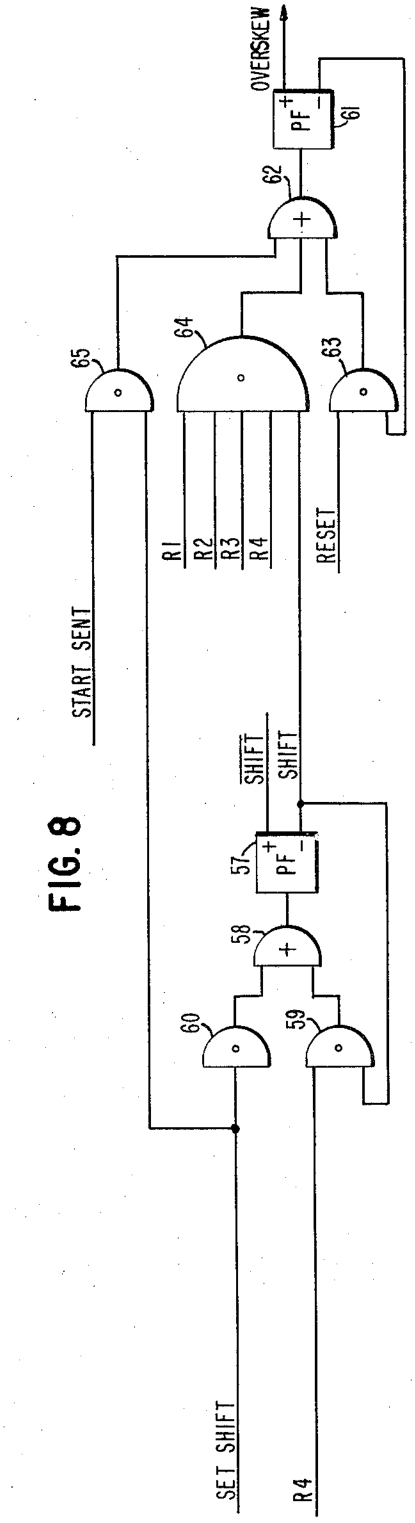

FIGURES 4*a*, 4*b*, 4*c*, 4*d*, and 4*e* show various symbols used to identify the logical components in the circuits of the present invention;

FIGURES 5*a* and 5*b* show a circuit diagram of the four frame registers;

FIGURE 6 is a circuit diagram of the control register;

FIGURE 7 is a diagram of certain control circuits responding to the initial start pattern frames; and FIGURE 8 shows the shift and overskew control circuits.

Figure 1:
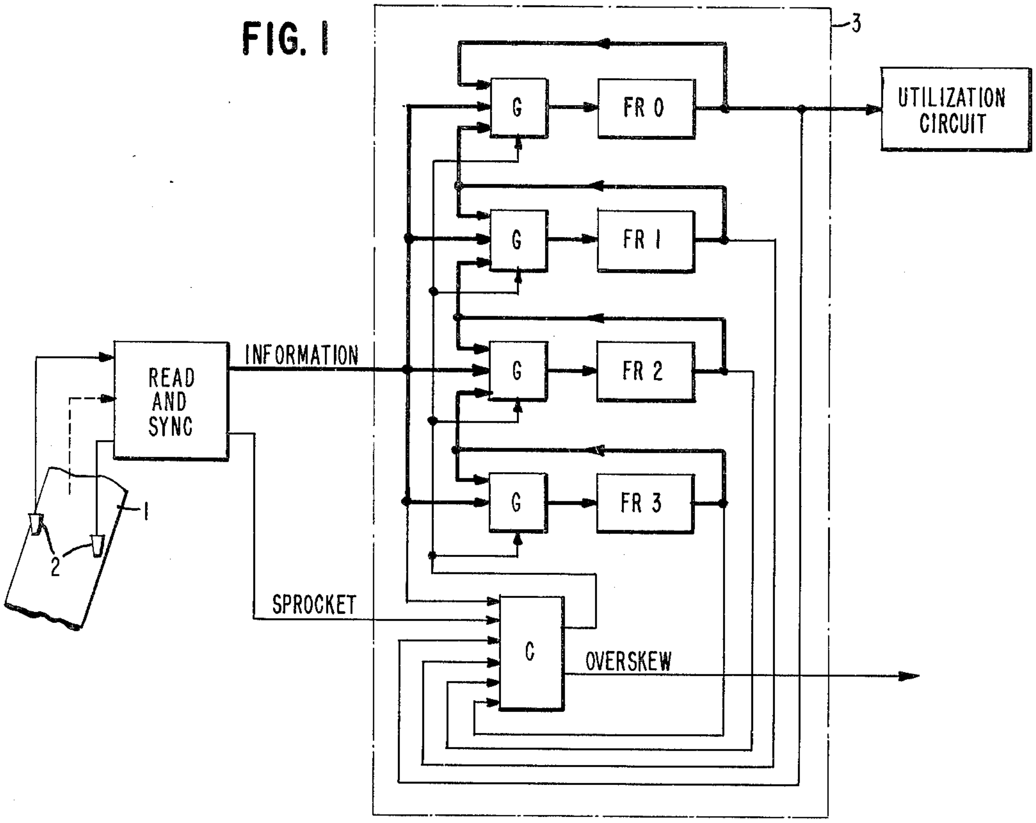
FIGURE 1 is a block diagram illustrating the novel arrangement of the present invention.
Figure 2:
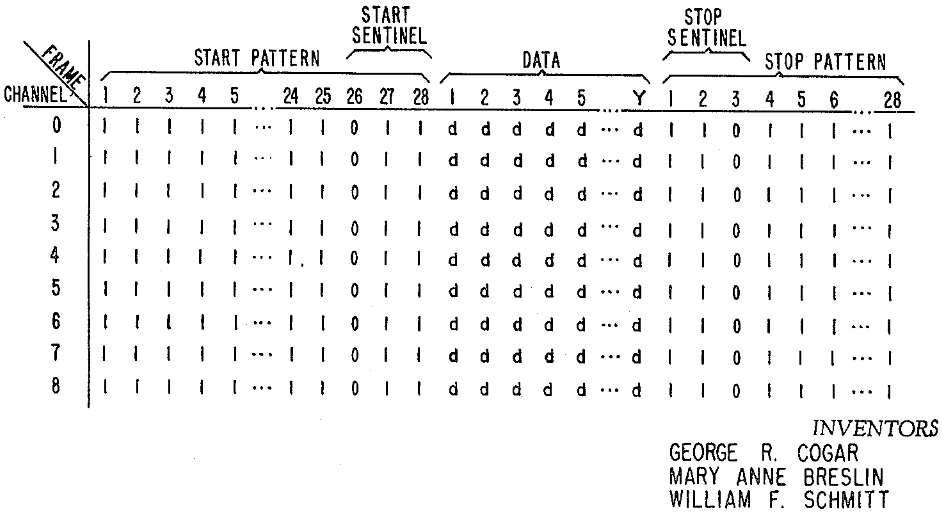
FIGURE 2 shows the composition of the start pattern and stop pattern frames which respectively precede and follow the data frames on the tape.

Referring first to FIGURE 1, there is shown a simplified block diagram of one embodiment of the invention which can correct up to four tape frames of skew. Assume that a magnetic tape or similar elongated storage medium 1 contains N (in this case, nine) parallel longitudinal channels, each channel having recorded therein one binary bit of each of a number of successively recorded nine-bit frames. The frames on storage medium 1 are divided into a plurality of records with each record having the general configuration as shown in FIGURE 2 of the drawings. There will be seen that a Z number of frames, for example frames 1 through 28, which are those initially read in a record, comprise the so-called Start Pattern, the first twenty-five frames of which are comprised of 1 binary bits in each of the nine channels 0 through 8. The next three frames numbered 26, 27 and 28 also part of the Start Pattern, but are additionally given the special name Start Sentinel since they immediately precede the Data frames. Frame 26 of the Start Pattern, which is the first frame of the Start Sentinel, is comprised of 0 bits in all nine channels, whereas frames 27 and 28 are comprised of 1 bits. The frame following frame 28 of the Start Pattern is the first frame of Data which may have either an 1 or a 0 bit in any of the nine channels. There may be as many Data frames as desired, and in FIGURE 2 this is indicated by the last Data frame identified as Y. Immediately following the last Data frame are a number of Stop Pattern frames which complete a record. The first three Stop Pattern frames are given the special name of Stop Sentinel. The first and second frames of Stop Sentinel contain binary 1's in all channels, whereas the last frame of Stop Sentinel contains binary 0's. The remaining frames 4 through 28 of the Stop Pattern contain binary 1's in all nine channels. Following frame 28 of the Stop Pattern, a gap occurs on the storage medium between a record and the next following record.

For purposes of this description, the bits comprising any given frame may be though of as being ordered with respect to one another according to the channel in which each is recorded. This means, therefore, that all the bits recorded in any given channel *n* have the same *n*th order significance even though they belong to different frames. The term "order" as used here and in the appended claims, however, is not to be construed as necessarily also meaning a predetermined mathematical order, such as $2^0$, $2^1$, etc. in the binary system of notation. This distinction is important, since some data processing systems with which the present invention finds use may be designed to consider two or more frames together as constituting a complete unified binary information word. In such a system then, the *n*th channel bit of one frame of an information word might have one binary mathematical order significance, whereas the same *n*th channel bit of a different frame of the same information word would have a different binary mathematical order significance. On the other hand, other systems with which the invention finds use may consider each frame as a separate and distinct binary coded character such that the *n*th channel bits of all frames have the same predetermined binary mathematical order significance.

Figure 3:
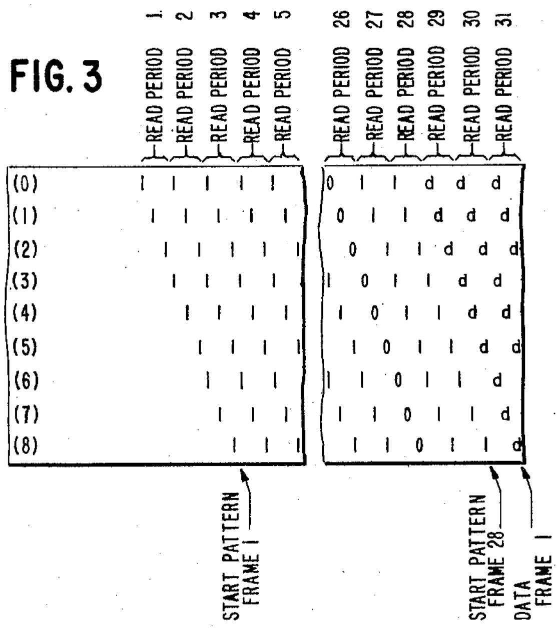
FIGURE 3 shows a typical example of how the frames on a tape may be skewed with respect to one another when being read.

Returning now to FIGURE 1, nine read or pick-up heads 2 are provided for concurrently scanning the tape channels. Each read head continuously scans its associated channel to thereby generate output signals indicative of the successive binary bits recorded therein. The heads scan independently of each other, there being no simultaneous gating or strobing signal applied to them. The output of each read head is directed to a Read and Synchronizing circuit which, in itself, does not form a part of the present invention. As a bit from a read head is received, it is placed into a binary flip-flop individual to the tape channel. The tape speed and recorded frame spacing are here assumed to result in a nominal time displacement of about 10 microseconds between each tape frame as it is read by the heads 2. Consequently, approximately 10 microseconds occur between the successive entry of bits into any given one of the nine channel flip-flops in the Read and Synchronizing circuit. However, because of tape skew, all bits of any given tape frame will not be simultaneously entered into their respective flip-flops. This condition is illustrated in FIGURE 3 for a typical skew configuration. Here assume that when the indicated tape record was originally recorded, the row of nine write heads was diagonal to the longitudinal direction of tape motion so as to record diagonal tape frames. However, if the row of nine read heads is at right angles to the tape motion, the channel 0 read head will detect a bit of any given frame long before the channel 8 head detects a bit of the same frame. Channel 0 could therefore be defined as the lead channel of that frame. FIGURE 3 shows that the channel 0 head will actually detect bits of three successive tape frames before the channel 8 head detects a bit of the first frame. Consequently, the example shown is one where there are three frames of skew. However, any other skew configuration is possible, for example, a channel 8 bit of a given frame may be detected long before the channel 0 bit of the same frame. In this case, channel 8 instead of channel 0 would be considered the lead channel Furthermore, the lead channel may vary from frame to frame, thus resulting in an irregular skew configuration quite different from that shown in FIGURE 3 which has been chosen merely to simplify the subsequent description of the operation.

A frame bit placed into any given flip-flop of the Read and Synchronizing circuit must be transferred therefrom to the deskew buffer circuits before entry of the next successive bit from the associated channel read head which occurs in about 10 microseconds. Furthermore, in the environment in which the present invention finds particular use, this bit transferred must be synchronized with the machine cycle employed in the skew buffer and utilization circuits. This machine cycle is of a four microsecond duration which is divided into nine time slots or intervals designated as $t_0$ through $t_8$. Each time slot is associated with a particular one of the tape channels, e.g., $t_0$ with channel 0, $t_1$ with channel 1, etc. A master clock pulse generator can be used to continuously generate nine successive and distinct pulses one for each time slot to uniquely identify same. This method is well known in the art. By using these nine pulses, designated as $t_0$ through $t_8$, to successively sample the contents of the nine storage flip-flops in the Read and Synchronizing circuit, the information stored therein can be serialized for transfer to the deskewing circuit. As an example, every four microseconds a $t_0$ time pulse is generated which samples the content of the channel 0 flip-flop. If the flip-flop contains either a binary 1 or 0 bit read from tape, then an appropriate voltage signal is placed on the INFORMATION conductor leading to the deskewing circuits of the present invention. At the same time $t_0$, a sprocket pulse is generated on the SPROCKET conductor to indicate that the voltage on the INFORMATION conductor is to be construed as representing a frame bit. Without such a Sprocket pulse, however, no binary value significance is attached to the INFORMATION conductor voltage by the deskew circuits, as will be subsequently described. After a particular tape has been sent from the channel 0 flip-flop to the deskew buffer, it cannot be sen again to the deskew circuit at the next following $t_0$ pulse time which occurs four microseconds later. In other words, no Sprocket pulse is generated at the next following $t_0$ time. It is only after entry into the flip-flop of the next successive channel 0 bit, that a $t_0$ time pulse can send the content of the flip-flop to the deskew circuit.

As an example of the above, and with reference to the diagram below, assume that during time $t_3$ of some given machine cycle $x$, the channel 0 read head places a frame bit into the channel 0 flip-flop.

$$x \qquad x+1 \quad x+2 \qquad x+3$$

$$t_3—t_8/t_0 \cdots t_8/t_0—t_7t_8/t_0 \cdots t_8/$$

$$|\underline{\quad 10\mu \text{ sec.} \quad}|$$

At $t_0$ time of the next following machine cycle $x+1$, a $t_0$ time pulse samples the content of the flip-flop and generates a low potential (representative of a binary 1) or a high potential (representative of a binary 0) on the INFORMATION conductor. At the same time $t_0$, a low potential (representative of a Sprocket pulse) is produced on the Sprocket conductor. Four microseconds later at the beginning of machine cycle $x+2$ another $t_0$ time pulse appears. However, by this next $t_0$ time there has not yet been read the next successive frame bit from tape channel 0, since the nominal time displacement between successive recorded bits of any given channel is 10 microseconds. Therefore, no negative sprocket pulse is generated during $t_0$ time of machine cycle $x+2$. During approximately time $t_7$ of machine cycle $x+2$, a new frame bit is entered into the channel 0 flip-flop from tape channel 0, thus replacing the bit entered during time $t_3$ of machine cycle $x$.

Consequently, the $t_0$ pulse of machine cycle $x+3$ is enabled to sense the content of the flip-flop and also generate a negative Sprocket pulse.

Each of the other channel flip-flops in the Read and Synchronizing circuit is sampled in the same manner as described above, but at different times during any given machine cycle. The resulting pattern of Sprocket pulses appearing serially on the SPROCKET conductor may therefore be quite irregular depending on exactly when new information in the channels is sensed by the read heads. As an example, in FIGURE 3 the channel 0 bit of the first Start Pattern frame might be sensed by the read head during time $t_3$ of a machine cycle $x$, with subsequent transfer to the deskew circuit at time $t_0$ of machine cycle $x+1$. The channel 1 bit of this same frame might be sensed from tape at time $t_4$ of machine cycle $x+1$, with subsequent transfer to the deskew circuit at time $t_1$ of machine cycle $x+2$. The channel 2 bit of this frame might be sensed from tape at time $t_4$ of machine cycle $x+2$, with subsequent transfer to the deskew circuit at time $t_2$ of machine cycle $x+3$. Both the channel 0 bit of Start Pattern frame 2, and the channel 3 bit of Start Pattern frame 1, might be sensed from tape at time $t_7$ of machine cycle $x+2$, with subsequent deskew circuit transfer of the former at time $t_0$ of machine cycle $x+3$ and of the latter at time $t_3$ of machine cycle $x+3$. Consequently, in looking at the Sprocket pulse pattern during these machine cycles, negative signals are generated on the SPROCKET conductor only during time $t_0$ of machine cycle $x+1$, time $t_1$ of machine cycle $x+2$, and times $t_0$, $t_2$, and $t_3$ of machine cycle $x+3$. Thus, time slot gaps may occur between successive Sprocket pulses, or, in other words, the Sprocket pulses need not be back-to-back.

In summary, then, the tape bits from all nine pick-up heads 2 are serialized and transferred to the deskewing circuit via the INFORMATION line. Simultaneously with the generation of each Information pulse, which may be either a Start Pattern Data, or Stop Pattern bit, a Sprocket pulse is generated on the SPROCKET output conductor. There is one Sprocket pulse for each 0 or 1 Information bit appearing on the INFORMATION conductor. Both the Information and the Sprocket pulses are sent to the deskew buffer circuits which are those enclosed by the dot-dash line 3 and which constitute the present invention. It should be emphasized here that any technique may be employed for generating a serial train of Information binary bit signals accompanied by corresponding Sprocket signals. Consequently, no details of the Read and Synchronizing circuit are shown, since the present invention relates only to the circuits for operating upon such a serial train in order to reassemble complete frames.

The deskew circuit reassembles the frames of Data in the order in which the frames were originally recorded. More than four frames of skew constitutes overskew in the embodiment of the invention disclosed herein. An overskew error signal is generated for such a condition which alerts the utilization circuits. In FIGURE 1, the deskew circuit includes four frame registers FR0, FR1, FR2, and FR3 and associated gating circuits which accept all information bits read from a tape record. Heavy lines indicate the primary paths for information. Each of these frame registers in the preferred embodiment comprises a dynamic shift register adapted to recirculate the bits appearing at its output back to its input. Provision is also made in each gating circuit for shifting the contents of a frame register into the next lower numbered frame register, e.g., the contents of FR3 may be shifted to FR2, and the contents of FR2 may be shifted to FR1, etc. The topmost frame register FR0 furthermore has an output directed to the utilization circuits for transferring a completely reassembled data frame thereto.

The gating circuits associated with the inputs of each of the frame registers also selectively enter Data bits appearing on the INFORMATION conductor into the frame register in which previously Data bits of the same given frame have been inserted. Consequently, when the read heads 2 are scanning the Data frames of a record, each of the frame registers FR0 through FR3 collects Data bits belonging to the same given frame. Upon frame register FR0 being filled with a completely reassembled Data frame, said frame is shifted to the utilization circuits and at the same time any partially reassembled Data frames in the registers FR1 through FR3 are shifted upward. Each given Data frame is completely reassembled and read from FR0 to the utilization circuits approximately 40 microseconds after its initially read bit appears on the INFORMATION conductor from the Read and Synchronizing circuits. However, all Start Pattern bits from tape, which are those initially scanned at the beginning of a tape record, must first enter FR3 before being gradually shifted upward to eventually reside in FR0. Start Pattern bits, which include the Start Sentinel bit configurations, cannot be read from FR0 to the utilization circuits but instead are lost. The Start Pattern bits are utilized to preset the frame registers to certain bit configurations in preparation for the reading of Data frames, as will subsequently be explained in detail.

The input gates for each frame register are controlled by signals generated by a control unit which in turn is responsive to a variety of input signals. The Information pulses themselves are fed to the control unit as well as the Sprocket pulse accompanying each said information pulse. In addition, the outputs of each frame register are simultaneously sampled at certain times by the control unit.

FIGURE 4 illustrates the symbols employed for the various logical building blocks shown in the circuit of FIGURES 5 through 8. The logical unit in FIGURE 4*a* may be thought of as an OR gate which generates a low or negative going signal in response to a high or positive going signal on any of its input conductors. For example, in FIGURE 4*a* it is seen that during machine cycle time periods $t_1$, $t_2$, and $t_3$, there is at least one positive input signal which thereby results in a negative output signal from the gate. At $t_0$, both input signals are low, thereby resulting in a positive output signal. If there is only one input terminal, the gate acts as an inverter. This same gate in FIGURE 4*a* may also be construed as an AND gate for indicating the simultaneous application of all negative input signals. When construed in this fashion, the legend of FIGURE 4*b* is employed. In FIGURE 4*b*, a positive output is generated from the gate only when all input signals are negative. This occurs in the example only during the time slots $t_1$ and $t_3$. Actually, both the gate in FIGURE 4*a* and the gate in FIGURE 4*b* are identical in construction, there being only a different interpretation applied to each regarding the significant input signals which they are to sense. Such gates are well known in the prior art and details are not here given.

Figure 4A:
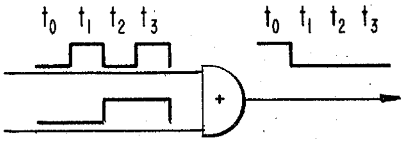
Figure 4B:
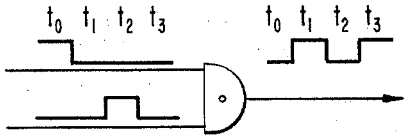
Figure 4C:
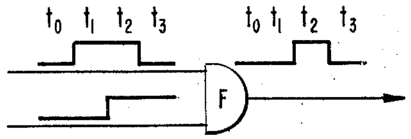

FIGURE 4*c* shows a positive AND gate for generating a positive or high output only upon the concurrent application of positive signals to all of its inputs. This condition in the illustrated example only occurs during time $t_2$. Consequently, for this function the details of the gate in FIGURE 4*c* differs from the circuit details of the gates in FIGURES 4*a* and 4*b*. However, positive AND gates are quite well known in the prior art.

Figure 4D:
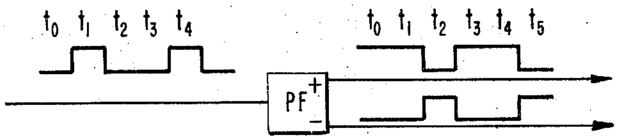

FIGURE 4*d* shows the symbol for a typical pulse former which has one input thereto and two outputs therefrom, with a one time slot delay inherent therein. Upon application of a negative or low input signal, the signal appearing from the output + terminal is high while that from the − output terminal is low. However, as will be noted, there is a one pulse time delay between application of the input signal and the resulting output signals. This is illustrated by the positive going input signal at time slot $t_1$, and the resulting negative output signal on the + terminal at time $t_2$. For positive input signals, a low output from the + terminal and a high output from the − terminal is generated with the one pulse time delay.

Figure 4E:
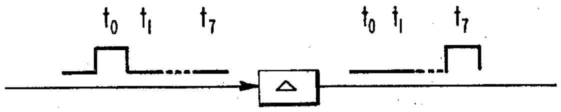

FIGURE 4*e* illustrates the symbol employed for a typical dynamic delay line, in this case having seven pulse times of delay. Consequently, a positive going signal applied to $t_0$ time to the input of the line will appear at its output at $t_7$ time.

FIGURE 5 shows details of the four frame registers FR0, FR1, FR2, and FR3, together with their input gates and portions of the control circuitry. In the disclosed embodiment of the present invention, each frame register is a nine pulse time dynamic delay loop comprised of pulse formers 10 and 11, a passive delay line 12, and a clear gate 13. The input pulse former 10 and the output pulse former 11 each provides one pulse time of dynamic delay, while the delay line 12 provides a seven pulse time passive delay. The clear gate 13 is a positive AND circuit having one input connected to the output of delay line 12 while the other input thereto is responsive to a temporary negative going CLEAR signal generated for erasing the contents of the loop in preparation for the receipt of a new record. In addition, an inverter gate 14 is provided between the output of gate 13 and the input of pulse former 11. The total delay in each of the frame registers is therefore nine pulse times which is measured from the time that a pulse enters pulse former 10 to the time when it emerges from output pulse former 11. As mentioned previously, the delay in each frame register must equal to the number of channels in a frame on the tape in order to collect all the bits in a given frame in the same frame register.

Each input pulse former 10 of a frame register is supplied a signal by the OR gate 15 which in turn is responsive to one of several inputs. One of the inputs to gate 15 is derived from a data read-in AND gate 16 which is selectively permissive to a data bit read from tape and appearing on the INFORMATION line. A binary 1 bit on the INFORMATION conductor is represented by a negative going, or low, potential signal whereas a binary 0 bit is represented by a positive going, or high, potential signal.

Another input to gate 15 is derived from the recirculation and shift gate 17 which has a dual purpose. During the loop recirculation time, gate 17 permits the bit appearing from the output pulse former 11 to be introduced back into the same frame register via the input pulse former 10. The second function of gate 17 is to permit a bit to be placed into its associated frame register from the output of the next higher numbered frame register during the shift operation. This shift operation occurs when a complete Data frame has been assembled in FR0 so that the frame may be read therefrom to the utilization circuitry. To perform these two functions, gate 17 receives a signal from OR gate 18 via inverter gates 19 and 20. OR gate 18 in turn is responsive to a signal from one of the gates 21 or 22. During the recirculation time, the input signal $\overline{\text{SHIFT}}$ to gate 21 is low, while the signal SHIFT to gate 22 is high. For this condition, a low output from pulse former 11, which indicates the emergence of a binary 1 bit therefrom, enables gate 21 to generate a high output. This high input to gate 18 in turn produces a low signal therefrom which arrives at gate 17 still in negative form via the inverters 19 and 20. Since the signal $\overline{\text{TRANSFER}}$ is low at all times except during entry of the START PATTERN bits, gate 17 responds to its two low inputs by generating a high output therefrom. The high output from gate 17 in turn produces a low signal from gate 15 which in turn emerges one pulse time later as a high signal from the + output terminal of pulse former 10. This high signal represents a binary 1 bit and is applied via delay 12 to gate 13. Normally, the CLEAR signal applied to gate 13 is high so that gate 13 generates a high output therefrom in response to two high inputs. The high output from gate 13 is inverted via gate 14 to apply a low signal to pulse former 11. A low input to pulse former 11 emerges one pulse time later as a low output from its − terminal. Thus, it is seen that gates 21, 18, 19, 20, 17, and 15 reproduce and re-enter the bits appearing from the output of pulse former 11.

On the other hand, during a shift operation the signal $\overline{\text{SHIFT}}$ is high while the signal SHIFT is low. For this condition, gate 21 will always produce a low output no matter what the output from pulse former 11. Gate $\mathbf{22_0}$ is now responsive to the bits emerging from pulse former $\mathbf{11_1}$ to enter said bits into frame register FR0 via gates $\mathbf{18_0}$, $\mathbf{19_0}$, $\mathbf{20_0}$, $\mathbf{17_0}$ and $\mathbf{15_0}$. As an example, a low output from pulse former $\mathbf{11_1}$ enables gate $\mathbf{22_0}$ to generate a high output therefrom. This high output enables gate $\mathbf{18_0}$ to generate a low output, with the remaining operation being identical to that discussed in connection with the recirculation of a 1 bit from pulse former $\mathbf{11_0}$. Conversely, if a binary 0 bit appears from pulse former $\mathbf{11_1}$, this is represented by a high signal from it − output terminal which generates a low signal from gate $\mathbf{22_0}$. The low signal from gate $\mathbf{22_0}$, coupled with a low signal from gate $\mathbf{21_0}$, generates a high signal from gate $\mathbf{18_0}$ which is applied to gate $\mathbf{17_0}$. Gate $\mathbf{17_0}$ in turn generates a low signal as one input to gate $\mathbf{15_0}$. Assuming that all other inputs to gate $\mathbf{15_0}$ are low, a high signal is generated to the input of pulse former $\mathbf{10_0}$ which in turn produces a low output from its + terminal, representative of a binary 0 bit.

Gate 15 of each of the frame registers FR0, FR1, and FR2 also has an input from a respective transfer gate 23 which is permissive only when Start Pattern bits are being read. Each gate 23 permits the Start Pattern bits in the next higher numbered frame register to be transferred into the next lower numbered frame register. For example, when the signal TRANSFER is low as well as the signal START SENTINEL DETECT, a low output from pulse former $\mathbf{11_1}$ allows gate $\mathbf{23_0}$ to generate a high signal which in turn produces a low signal from gate $\mathbf{15_0}$. The low output from pulse former $\mathbf{11_1}$ represents a binary 1 bit, whereas the low output from gate $\mathbf{15_0}$ also indicates the entry of a binary 1 bit into frame register FR0. When the signal TRANSFER is low, the signal $\overline{\text{TRANSFER}}$ is high which in turn is applied to all of the gates 17 in order to prevent a recirculating bit from entering back into a given frame register. This is so, since a high signal $\overline{\text{TRANSFER}}$ will maintain each gate 17 at a low output in order to avoid masking the output from the gate 23. Even though the signal TRANSFER is low, this signal START SENTINEL DETECT must also be low in order to permit transfer of the START PATTERN bits from register to register. The signal START SENTINEL DETECT becomes high at selective times as will subsequently be described.

FIGURE 5 also contains a portion of the control circuitry necessary to generate certain of the gate conditioning signals. Each frame register is provided with a gate 24 which, upon generating a low output, selects its associated gate 16 to receive Data bits from the INFORMATION input line. The output from each gate 24 is also inverted via a gate 25 whose output in turn is directed to gate 17 of the next higher numbered frame register. A high signal from a gate $25_n$ causes the next higher numbered gate $17_{n+1}$ to generate a low output which, when combined with low signals on the other inputs to the gate $15_{n+1}$, enters a binary 0 into the next higher numbered frame register $FR_{n+1}$. The output of gate 24 is determined by its input which is derived from a respective gate 26. The inputs to the respective gates 26 vary according to the frame register with which they are associated, with these gates being used to designate the frame that the Data bit being read belongs to by selecting the appropriate frame register data input gate 16. Gate $26_0$, for example, has inputs from gates $18_1$, $18_2$ and $18_3$. Gate $26_1$ has inputs from gates $18_2$ and $18_3$, as well as an input from its own gate $19_1$. Gate $26_2$ has an input derived from both its own gate $19_2$ and from gate $18_3$ in frame register 3. Gate $26_3$ has an input derived from gate $19_3$. In addition, all of the gates 26 are responsive to the DATA SPROCKET signals which are generated one for each of the Data bits appearing on the INFORMATION conductor. The DATA SPROCKET signals, however, are not generated for the Start Pattern bits. A further signal R4′ from the output of the conrol register of FIGURE 6 is sent to all of the gates 26. The control register will be discussed subsequently.

The output from gate $26_3$ is also directed to a gate 27 which is used to set the shift flip-flop in FIGURE 8. Upon the setting of the shift flip-flop, the $\overline{\text{SHIFT}}$ signal becomes high and the SHIFT signal becomes low, thus effecting a shift of information upward through the frame registers in the manner previously described. A low SHIFT signal is also applied to gate 28 which receives the output from pulse former $11_0$ via gate 29. The low SHIFT signal is present for nine pulse times, during which the information in FR0 is gated via 28 to the utilization circuitry. Information thus gated comprises all of the bits contained in a given Data frame of the tape.

Gate $25_3$ is utilized to enter a binary 0 into the control register recirculating loop of FIGURE 6. The entry of 0 therein occurs at the beginning of each shift operation in order to control the shift time. Zeros are also entered into the control register via gate $25_3$ whenever the $\overline{\text{TRANSFER}}$ signal is high, thus enabling a low signal from gate $24_3$ and a high signal from gate $25_3$.

FIGURE 6 shows details of the control register CR which is part of the control circuitry. The control register has two primary functions. The first is to designate when the frame registers contain Data bits rather than Start Pattern bits. The second is to time the shift operation by designating which channel effected the shift. These operations will be explained in detail in subsequent paragraphs.

The actual construction of the control register is identical to that of the frame registers. An input pulse former 30, with the one pulse time delay, is connected in series with a seven pulse time delay 31 and an output pulse former 32. Also in circuit is a gate 33 and an inverter 34, the former being used to clear the control register prior to the reading of a new record on tape. It may therefore be seen that the control register has the same nine pulse time length as each of the frame registers, so that information traveling therethrough steps in unison with that in the frame registers. The input to pulse former 30 is derived from a gate 33 which in turn receives an input from gate 34 as well as the signal START SENTINEL DETECT. Gate 34 in turn derives an input from gate 35 and from the ENTER 0 signal of FIGURE 5. Gate 35 in turn is conditioned to recirculate the bit exiting from pulse former 32 if the signal START SENTINEL is low.

For times other than during shift, gate 36 is responsive to the output from the − terminal of pulse former 32 in order to pass, via gate 37, the bits from the control register. The output signal from gate 37 is denoted as R4′, while the output taken directly from the − terminal of pulse former 32 is denoted as R4. During the shift operation, the low SHIFT signal is applied via gate 38 to gate 37 in order to maintain a low signal R4′ during the shift period.

FIGURE 7 shows control circuitry for generating signals most of which are used during the entry of the Start Pattern bits into the frame registers. For example, a Start Sentinel Search flip-flop is provided which is comprised of a pulse former 39 and gates 40 and 41. This flip-flop is in the SET state when tape reading commences, but is reset when the Start Sentinel configuration 011 is detected in all of the nine tape channels. The flip-flop is considered to be in its SET state when a low signal is generated from its − output terminal (with the corresponding high signal from its + output terminal). It is set by a high going signal SET START SENTINEL FF (from circuitry not shown which detects the gap between records) applied to gate 41 which in turn generates a low output. The low output from gate 41 encounters a one pulse time delay through pulse former 39 and emerges as a low output from the − output terminal. In turn, the low signal from this − output terminal is returned to gate 40 where it is assumed that the signal from gate 42 is low. Consequently, with two low inputs, gate 40 generates a high output which in turn produces a low output from gate 41. As long as the output of gate 42 remains low, a low output appears from the − terminal of pulse former 39 even though the temporarily high signal SET START SENTINEL FF again returns to a low value. The START SENTINEL FF can only be reset, i.e., the − terminal signal goes high and the + terminal signal goes low, if the output from gate 42 becomes high. Such a high signal from gate 42 in turn produces a low signal from gate 40 which, when coupled with the normally low signal SET START SENTINEL FF, generates a high signal from gate 41 to make high the signal from the − output terminal of pulse former 39. This high signal, when returned to gate 40, thereby maintains the input to pulse former 39 high, and the flip-flop consequently remains reset until set again by the high signal SET START SENTINEL FF at the beginning of the next record.

As soon as the Start Sentinel configuration 011 has been detected in all of the nine tape channels, the control register CR contains 1 bits in all positions. To detect this condition and thus enable gate 42 to reset the Start Sentinel FF, a pulse former 43 is provided having an input gate 44 which in turn derives inputs from gates 45 and 46′. Any binary 0 bit in CR will generate the low output signal $\overline{\text{R4}}$ upon emerging from pulse former 32. At this time, if the signal START SENTINEL is low, gate 46′ generates a high output which in turn produces a low output from the − terminal of pulse former 43 after a one pulse period delay. This low output signal is returned to gate 45 where, if the output from gate 46 is also low, it enables gate 45 to produce a high output which in turn maintains the low output from pulse former 43. Consequently, pulse former 43 and gates 44 and 45 constitute a flip-flop set by gate 46' and which is maintained set via gate 45, unless a high output appears from gate 46. As long as pulse former 43 produces a low output, gate 42' maintains the low output from gate 42 which cannot reset the Start Sentinel FF. However, if pulse former 43 produces a high output at the $t_8$ time of a machine cycle (and while the Start Sentinel FF is set) then a high output is generated from gate 42 which resets the Start Sentinel FF.

If a binary 1 emerges from the output of the control register at time $t_8$ of a machine cycle $x$ (while the Start Sentinel FF is set), then the output from gate 46 is high because of all low inputs. This high output in turn forces the output of gate 45 to go low which, when coupled with the low output from gate 46', makes high the output from pulse former 43. However, due to the fact that there is a one pulse time delay through pulse former 43, this high output appears at the next following $t_0$ time of machine cycle $x+1$ just after the disappearance of the $t_8$ time pulse, so that gate 42 does not yet produce a high output. If there is any binary 0 bit in CR, it will thereafter appear as a low signal $\overline{R}4$ to the input of gate 46' at some time $t_0$–$t_7$ of machine cycle $x+1$ but before the next following $t_8$ pulse. This binary 0 again produces a low signal from pulse former 43 to prevent the $t_8$ pulse of machine cycle $x+1$ from generating a high output from gate 42. Consequently, it is only when CR contains binary 1's in all positions that gate 46' is unable to produce a high output sometime during the machine cycle following that in which pulse former 43 was reset to a high output.

The outputs from pulse former 39 are applied to a variety of gates. For example, when the Start Sentinel FF is set, the low signal from the — terminal of pulse former 39 is applied to gate 50 in order to prepare it for a generation of the low TRANSFER signals used in FIGURE 5. Gate 50 must have low signals applied to all of its inputs to generate a high output which in turn is inverted via gate 51. For each information bit entering on the INFORMATION line of FIGURE 5, a low signal is generated on the SPROCKET line which is applied to gate 50. The normally low signal SET START SENTINEL FF is also applied to gate 50, as well as a low signal $\overline{R}4$ which indicates that the control register output bit is 0. Thus, if the Start Sentinel FF is set, then a low TRANSFER signal is generated from gate 51 for each of the low Sprocket pulses. Each of the Start Pattern bits has a low Sprocket pulse accompanying it. Gate 52 inverts the output from gate 51 to generate the complementary signal $\overline{\text{TRANSFER}}$ which is used in FIGURE 5 in the manner previously described.

Gate 53 generates the low DATA SPROCKET signals used in FIGURE 5 for enabling gates 26. As before mentioned, a low Sprocket pulse is generated for each of the bits in any of the Start Pattern or Data frames, said low pulses being applied to gate 50 and to gates 54 and 55. However, it is desired to generate low DATA SPROCKET signals from gate 53 only when a Data frame bit is being entered. If a binary 1 is emerging from pulse former 32 of the control register in FIGURE 6, this indicates that the low Sprocket signal applied to gate 54 at this time accompanies a Data bit appearing simultaneously on the INFORMATION lead. For such a condition, the two low inputs to gate 54 generate a high output therefrom which produces a low signal from gate 53. A DATA SPROCKET low signal may also be generated if the Start Sentinel Search flip-flop is reset, since this implies that the Start Sentinel pattern of 011 has been detected in all nine channels and therefore the bit being read from tape must be from a Data frame. This detection is performed by gate 55 which is responsive to a low signal from the + output terminal of pulse former 39.

When once the Start Sentinel bits 011 have been read for any given tape channel, this fact must also be indicated so that subsequent data bits may be entered from that tape channel into the appropriate frame register. This indication is performed by gate 56 which is responsive to certain outputs from the four frame registers, the control register, and to a 1 bit entering on the INFORMATION line. Furthermore, a low Sprocket bit must be present, with the Start Sentinel FF set. For example, a high signal is generated from gate 56 if the binary outputs of FR0, FR1, FR2, and FR3 are 1, 1, 0 and 1, respectively. In addition, the entering bit on the information line must also be a 1, while the bit emerging from the control register must be 0. This configuration thereby indicates that the Start Sentinel bits 011 have been completely read in a given channel, and that any bits detected in the channel hereafter belong to data frames. The high signal from gate 56 is applied to gate 33 of FIGURE 6 to enter a binary 1 into the control register. The signal from gate 56 is also applied to gates $23_0$ and $15_1$ to enter a binary 0 and a binary 1, respectively, into frame registers FR0 and FR1. This is accomplished, because a high signal to gate $23_0$ makes its output low which in turn generates a high output from gate $15_0$ if its other inputs are low. The high output from gate $15_0$ represents a binary 0. On the other hand, the high signal START SENTINEL DETECT which is applied to gate $15_1$ causes said gate to generate a low output which is indicative of a binary 1.

FIGURE 8 discloses control circuitry for effecting the shift operation and for indicating an overskew condition. A Shift flip-flop is provided which is comprised of pulse former 57, and gates 58, 59. This Shift flip-flop is considered to be set when a low signal is generated from its — output terminal. Setting is accomplished by applying a low SET SHIFT signal from gate 27 in FIGURE 5 to gate 60 in FIGURE 8. The output from gate 60 becomes positive which in turn drives gate 58 low and thus produces a low signal from the — output terminal of pulse former 57 after a one pulse time delay. The low signal is fed back to gate 59. As long as binary 1's keep emerging from pulse former 32 of the control register in FIGURE 6, signal R4 is also low, thus making all inputs to gate 59 low and generating a high signal therefrom. This high signal produces a low signal from gate 58 thus keeping the low signal representation from the — terminal of pulse former 57. The only way in which the Shift flip-flop can be reset is by the emergence of a binary 0 from the control register which would thereby cause the signal R4 to become high. Such a high signal would thereby drive the output of gate 59 low, which, when coupled with the normally low output from gate 60 (since the SET SHIFT signal is normally high), will generate a high signal from gate 58 thus proucing a high signal from the — output terminal of pulse former 57.

An Overskew flip-flop is also shown in FIGURE 8 which is comprised of a pulse former 61 in combination with gates 62 and 63. This Overskew flip-flop is set when a low signal appears from the — output terminal of pulse former 61. Such a condition may be initiated by a high output from either one of the two gates 64 or 65, each sampling the presence of a condition which indicates overskew. Gate 64 is responsive to the Set condition of the Shift flip-flop as well as to the emergence of binary 1's from all of the frame registers FR1, FR2, and FR3, as well as a binary 1 from the control register. Thus, if all inputs to gate 64 are low, a high output is generated therefrom which produces a low output from gate 62. This low output from gate 62 produces a low output from the — terminal of pulse former 61, said low output being returned to gate 63. Since the RESET signal is normally held low (by circuits not shown but which operate after the error has been corrected), the two low inputs to gate 63 produce a high output therefrom which in turn applies a low signal to pulse former 61 via gate 62. Consequently, when once the Overskew flip-flop has been set, it remains in this condition until a high RESET signal is applied to gate 63, whereupon the output from gate 63 goes low which in turn, when combining with other low inputs to gate 62, produces a high output to the pulse former and thus changes the polarity of its output signals.

The second way in which the Overskew flip-flop can be set is by a high signal from gate 65 which is responsive to the set condition of the Start Sentinel flip-flop of FIGURE 7 as well as to the low signal SET SHIFT which is used to set the Shift flip-flop. A high output from gate 65 again produced the low signal from the — output terminal of pulse former 61 which recirculates via gates 63 and 62 to maintain the set condition of the Overskew flip-flop.

OPERATION

The deskew circuit operates in two modes for each complete record read from tape. The first is the Start Pattern mode in which there is no transfer from FR0 to the utilization circuits, whereas the second is the Data mode in which there can be a transfer from FR0 to the utilization circuits. In both modes the register CR is used as a control loop. When the deskew buffer operates in the Start Pattern mode, all of the nine positions in CR contain 0 bits. A binary 1 is forced into a given one of these CR positions after the complete Start Sentinel configuration 011 has been read in from the given tape channel. When the given position is filed, all information bits received hereinafter from that tape channel belong to Data frames. For this condition the deskew circuit must operate in the data mode for that particular channel only. After all nine tape channels have been switched to data mode, i.e., the Start Sentinel configuration 011 has been received for each of the channels, then any completely deskewed frame of Data being assembled in the frame registers may be shifted to the utilization circuit from FR0.

The Start Pattern mode is used when the Start Pattern, consisting of the first twenty-eight frames in a record, is read into the deskew circuit via the INFORMATION line. Since the Start Pattern is not transferred to the utilization circuit, the frames of Start Pattern are not reassembled in the deskew buffer in the same manner as are the frames of Data. Instead, the Statrt Pattern bits are channel oriented which means that each time slot in a frame register operates without reference to the other time slots of the same register. That is to say, each frame register may contain bits from as many as four different Start Pattern frames, which is to be contrasted with the operation during Data mode wherein each frame register contains bits belonging only to the same given Data frame.

This configuration of Start Pattern bits in the frame registers is accomplished by reading every such bit appearing on the INFORMATION line only into FR3 during the Start Pattern mode. The bits are then successively transferred to loops FR2, FR1, and FR0, respectively. The transfer of a given channel bit from register to register takes place when the next succeeding bit from the same given channel is read into FR3. For example, the channel 0 bit Start Pattern frame 1 is read into FR3 at $t_0$ time of some machine cycle $x$. This bit is then transferred to FR2 at $t_0$ time of some subsequent machine cycle at the same time that the channel 0 bit of Start Pattern frame 2 is being entered into FR3. This sequence continues, until the bit finally reaches FR0. There it will be eventually supplanted by the next following channel 0 bit. The supplanted bit is lost. However, such a loss is of no consequence since there is no transfer of Start Pattern bits to the utilization circuits.

In order to better understand the over-all operation of the deskew circuit during the Start Pattern mode, reference is now made to FIGURE 3 and to Tables 1, 2, 3, and 4 given below. In these tables, the register designation is given in the leftmost column, and the binary bit value contained in each of the nine loop locations at the specified pulse time is given in the rightmost columns. For purposes of this description, each register loop is considered to be comprised of nine bit locations or positions numbered 0 through 8. Piston 8 of a loop is that into which a bit is inserted from gate 15, whereas position 0 is that occupies a bit one pulse time prior to its emergence from pulse former 11. Thus, when a binary bit value is inserted into a register loop, it first enters position 8 and from there travels the length of the delay loop in going successively from position 8 to positions 7, 6, 5, 4, 3, 2, 1 and 0.

In order to simplify the description of circuit operation, it will be convenient to consider an idealized situation where the serializing of information bits in FIGURE 3 occurs during successive "read periods" each of one machine cycle (4 microseconds) duration which is divided into the nine time slots beginning with $t_0$ through $t_8$. That is to say, it is possible to think of the incoming information bits to the deskew circuits as all being back-to-back in successive machine cycles, instead of being widely separated as has been previously described in connection with FIGURE 1. Thus, although this concept results in a timewise compression the actual Information (and consequently Sprocket) pulse trains, there is no change in the order of bit appearance or in the time slots $t_n$ with which the bits are associated. For example, assume that during a read period 1 there appear successive Sprocket pulses at successive times $t_0$, $t_1$, and $t_2$ which respectively accompany the low INFORMATION signals used to represent the binary 1 bits contained in channels 0, 1, and 2 of Start Pattern Frame 1. There are no Sprocket pulses generated during times $t_3$–$t_8$ of this first read period, since no information bits are detected in channel 3–8. During the next following read period 2 (which can be assumed to start at the next $t_0$ time following completion of read period 1), Sprocket pulses are generated at times $t_0$ through $t_5$. The Sprocket pulses at $t_0$·$t_1$, and t2 accompany the channel 0, 1, and 2 bits of Start Pattern frame 2, while the Sprocket pulses at times $t_3$, $t_4$, and $t_5$ accompany the channel 3, 4, and 5 bits of Start Pattern frame 1. During read period 3, Sprocket pulses are generated for each of the time slots $t_0$ through $t_8$, since information bits are sensed in all channels. Succeeding read periods are described below in further detail.

Prior to the reading of a new record from tape, an appropriate low CLEAR signal (generated by circuits not shown) is temporarily applied to gates 13 of the frame registers and to gate 33 of the control register. This low signal de-energizes these gates to clear the registers of any binary 1's which may be contained therein in preparation for receipt of the information from the record now to be read. Consequently, part (a) of Table 1 indicates the registers as they appear after being cleared but before commencement of the first read period.

*Table 1. Read period 1*

(a)

| Register | 8 | 7 | 6 | 5 | 4 | 3 | 2 | 1 | 0 |
|---|---|---|---|---|---|---|---|---|---|
| FR0 | 0 | 0 | 0 | 0 | 0 | 0 | 0 | 0 | 0 |
| FR1 | 0 | 0 | 0 | 0 | 0 | 0 | 0 | 0 | 0 |
| FR2 | 0 | 0 | 0 | 0 | 0 | 0 | 0 | 0 | 0 |
| FR3 | 0 | 0 | 0 | 0 | 0 | 0 | 0 | 0 | 0 |
| CR | 0 | 0 | 0 | 0 | 0 | 0 | 0 | 0 | 0 |

(b) $t_0$

| | | | | | | | | | |
|---|---|---|---|---|---|---|---|---|---|
| FR3 | $1_{10}$ | 0 | 0 | 0 | 0 | 0 | 0 | 0 | 0 |
| CR | 0 | 0 | 0 | 0 | 0 | 0 | 0 | 0 | 0 |

*Table 1*—Continued (c) $t_1$

| | | | | | | | | | |
|---|---|---|---|---|---|---|---|---|---|
| FR3 | $1_{11}$ | $1_{10}$ | 0 | 0 | 0 | 0 | 0 | 0 | 0 |
| CR | 0 | 0 | 0 | 0 | 0 | 0 | 0 | 0 | 0 |

(d) $t_2$

| | | | | | | | | | |
|---|---|---|---|---|---|---|---|---|---|
| FR3 | $1_{12}$ | $1_{11}$ | $1_{10}$ | 0 | 0 | 0 | 0 | 0 | 0 |
| CR | 0 | 0 | 0 | 0 | 0 | 0 | 0 | 0 | 0 |

(e) $t_8$

| | | | | | | | | | |
|---|---|---|---|---|---|---|---|---|---|
| FR3 | 0 | 0 | 0 | 0 | 0 | 0 | $1_{12}$ | $1_{11}$ | $1_{10}$ |
| CR | 0 | 0 | 0 | 0 | 0 | 0 | 0 | 0 | 0 |

As may be seen from FIGURE 3, the first idealized read period carried out by the Read and Synchronizing circuit will detect 1 bits of Start Pattern Frame 1 in channels 0, 1, and 2, there being no information detected in channels 3 through 8. The information sensed during the first read period is seralized with the channel 0 bit appearing in the $t_0$ time slot, the channel 1 bit appearing in the $t_1$ time slot, and the channel 2 bit appearing in the $t_2$ time slot. Consequently, the information bits appearing during the first read period are the following, in their order of appearance: $1_{10}$, $1_{11}$, $1_{12}$. The subscript digits associated with the binary bit value indicate the frame and channel location of said binary bit, with the leftmost digit identifying the former. Therefore, the notation $1_{10}$ indicates that a 1 binary bit value is found in the first Start Pattern frame in channel 0. Each of the binary 1 values generated during the first read period is accompanied with a low sprocket pulse from the Read and Synchronizing circuit. These sprocket pulses appear on the SPROCKET lead which is applied to FIGURE 7. However, there is no sprocket pulse associated with any of the time slots $t_3$ through $t_8$ of read period 1 since no information has been detected in channels 3 through 8 during this time.

The bit $1_{10}$ appears as a low pulse on the INFORMATION line of FIGURE 5. It is accompanied by a low sprocket pulse which appears as an input to gates 50, 54, 55, and 56 in FIGURE 7. Prior to receipt of this first bit, the Start Sentinel FF has been set by a temporarily high signal SET START SENTINEL FF. Consequently, by the time that this first sprocket pulse appears, a low signal from the — terminal of pulse former 39 is being applied to gate 50. Also by this time, the SET START SENTINEL FF signal is returned to its normal low voltage level. Furthermore, since the control register CR in FIGURE 6 contains all 0 bits, a low output appears from the + terminal of pulse former 32 at this $t_0$ time. Consequently, the output from gate 50 is high at $t_0$ which produces a low TRANSFER signal from gate 51. A high signal appears from gate 52. The high signal $\overline{\text{TRANSFER}}$ is applied via gate $\mathbf{24}_3$ to generate a low signal therefrom. The low output from gate $\mathbf{24}_3$ conditions gate $\mathbf{16}_3$ to enter into FR3 the binary bit $1_{10}$ (represented by a low signal) now appearing on the INFORMATION line. At the same time, gate $\mathbf{25}_3$ inverts the output from $\mathbf{24}_3$ to apply a high signal ENTER 0 to gate 34 in FIGURE 6. The low output from gate 34 is combined with the low output from gate 56 in FIGURE 7 to produce a high output from gate 33 which effectively enters a binary 0 into control register CR.

At the conclusion of time $t_0$, it may therefore be seen that bit $1_{10}$ is entered into position 8 of FR3 as is shown in part (b) of Table 1. None of the other data read gates $\mathbf{16}_0$ through $\mathbf{16}_2$ is energized during $t_0$, since none of the gates $\mathbf{24}_0$ through $\mathbf{24}_2$ generates a low output at this time. While bit $1_{10}$ is being entered into FR3 via gates $\mathbf{16}_3$ and $\mathbf{15}_3$, the outputs from pulse formers $\mathbf{11}_1$, $\mathbf{11}_2$, and $\mathbf{11}_3$ are being entered into register FR0, FR1, and FR2, respectively, via the respective transfer gates $\mathbf{23}_0$, $\mathbf{23}_1$, and $\mathbf{23}_2$.

These transfer gates are enabled at this $t_0$ time because of the low signal TRANSFER previously discussed. The START SENTINEL DETECT signal is also low at $t_0$ time of the first read period due to the fact that one or more of its inputs is high. Since all of the frame registers FR1, FR2, and FR3 are initially filled with 0's at this first read time, 0's are therefore entered into positions 8 of frame registers FR0, FR1, and FR2 via their respective transfer gates. For this reason, part (b) of Table 1 does not show the contents of FR0, FR1, and FR2 which are identical to those shown for these registers in part (a) of Table 1.

At the next time interval $t_1$ of the first read period, the bit appearing on the INFORMATION line is $1_{11}$ represented by a low signal which is accompanied by a low signal on the SPROCKET conductor. As during $t_0$, the signal $\overline{\text{R4}}$ is low because of the emergence of a binary 0 from position 0 of the control register. Furthermore, the Start Sentinel flip-flop is at this time still in its set condition so that a low signal appears from the — terminal of pulse former 39. Gate 50 is once again enabled to generate a high signal which in turn produces the low TRANSFER pulse and the high $\overline{\text{TRANSFER}}$ pulse which are employed to enter bit $1_{11}$ into FR3, and at the same time transfer 0 bits from the outputs of FR3, FR2, and FR1 into FR2, FR1, and FR0, respectively. It will be noted in part (c) of Table 1 that the entering bit $1_{11}$ is placed into position 8 of FR3 which is vacated by this time due to the shifting of bit $1_{10}$ to position 7.

At time $t_2$ of the first read period, bit $1_{12}$ appears on the INFORMATION line accompanied by a low Sprocket pulse. The generation of the high TRANSFER signal and the low $\overline{\text{TRANSFER}}$ signal thereupon places a bit into FR3 in a manner identical to that discussed in connection with times $t_0$ and $t_1$. Thus, at the end of time $t_2$, the contents of FR3 is as shown in part (d) of Table 1, with frame registers FR0, FR1, and FR2 each holding 0 bits in all positions.

During times $t_3$ through $t_8$ of the first read period, the signal level on the INFORMATION conductor remains high since there are no 1 bits read from tape channels 3 to 8. However, there are no Sprocket pulses at this time. The content of each loop recirculates until initiation of the second read period. During this recirculation time the TRANSFER signal remains high and the $\overline{\text{TRANSFER}}$ signal remains low. The low $\overline{\text{TRANSFER}}$ signal thereupon enables gates $\mathbf{17}_0$ through $\mathbf{17}_3$ to pass the digit appearing from gates $\mathbf{20}_0$ through $\mathbf{20}_3$. The information supplied to the latter set of gates is derived from gates $\mathbf{21}_0$ through $\mathbf{21}_3$ via the intermediate gates $\mathbf{18}_0$ to $\mathbf{18}_3$. Since the Shift flip-flop is not set during the reading of the Start Pattern, the $\overline{\text{SHIFT}}$ signal is low thus enabling a gate 21 to transfer the information appearing from its associated output pulse former 11. Consequently, information appearing at the output of a frame register is reinserted back into the same frame register via the input pulse former 10. Since the TRANSFER signal at this time is high, transfer gates 23 constantly generate a low output therefrom no matter what the output from the pulse former 11 of the next higher numbered frame register. Furthermore, during recirculation time each of the gates 16 generates a low output due to the high signal from the associated gate 24. At the conclusion of time $t_8$ of the first read period, the register configuration is as shown in part (e) of Table 1.

During read period 2, an examination of FIGURE 3 shows that the following bits are serialized during times $t_0$ through $t_5$: $1_{20}$, $1_{21}$, $1_{22}$, $1_{13}$, $1_{14}$, and $1_{15}$, respectively. Thus, 1 bits in channels 0 through 2 of the second frame first appear on the information line in that order, followed by 1 bits in channels 3 through 5 of the first frame. Each of the time positions $t_0$ through $t_5$ of the second read period is accompanied by a low sprocket pulse. Time $t_0$ of the second read period commences while bit $1_{10}$ is emerging from the output of FR3. At this time, 0 bits are also emerging from the outputs of FR0, FR1, FR2, and CR. The Start Sentinel flip-flop is still in its set condition. Consequently, the low sprocket pulse accompanying bit $1_{20}$, together with the low signal $\overline{\text{R4}}$, causes gate 50 to generate a high output which thereupon produces a low TRANSFER signal and a high $\overline{\text{TRANFSER}}$ signal. These two signals permit bit $1_{20}$ to enter FR3, as well as transferring bits from the outputs of FR3, FR2 and FR1 to the inputs of FR2, FR1, and FR0, respectively. Part (a) of Table 2 illustrates the contents of all frame registers and the control register after completion of time $t_0$. Bits $1_{11}$ and $1_{12}$ by this time have been shifted into positions 0 and 1, respectively, of FR3, while bit $1_{20}$ is now in position 8 of FR3. Bit $1_{10}$ has been transferred from the output of FR3 to position 8 of FR2. Since 0 bits are transferred from the outputs of FR2 and FR1, it is seen that positions 8 of FR1 and FR0 contain 0's. The control register also contains all 0's a 0 bit having been entered into pulse former 30 from gate $25_3$ in FIGURE 5.

*Table 2.—Read period 2*

(a) $t_0$

| Register | 8 | 7 | 6 | 5 | 4 | 3 | 2 | 1 | 0 |
|---|---|---|---|---|---|---|---|---|---|
| FR0 | 0 | 0 | 0 | 0 | 0 | 0 | 0 | 0 | 0 |
| FR1 | 0 | 0 | 0 | 0 | 0 | 0 | 0 | 0 | 0 |
| FR2 | $1_{10}$ | 0 | 0 | 0 | 0 | 0 | 0 | 0 | 0 |
| FR3 | $1_{20}$ | 0 | 0 | 0 | 0 | 0 | 0 | $1_{12}$ | $1_{11}$ |
| CR | 0 | 0 | 0 | 0 | 0 | 0 | 0 | 0 | 0 |

(b) $t_1$

| | | | | | | | | | |
|---|---|---|---|---|---|---|---|---|---|
| FR2 | $1_{11}$ | $1_{10}$ | 0 | 0 | 0 | 0 | 0 | 0 | 0 |
| FR3 | $1_{21}$ | $1_{20}$ | 0 | 0 | 0 | 0 | 0 | 0 | $1_{12}$ |
| CR | 0 | 0 | 0 | 0 | 0 | 0 | 0 | 0 | 0 |

(c) $t_2$

| | | | | | | | | | |
|---|---|---|---|---|---|---|---|---|---|
| FR2 | $1_{12}$ | $1_{11}$ | $1_{10}$ | 0 | 0 | 0 | 0 | 0 | 0 |
| FR3 | $1_{22}$ | $1_{21}$ | $1_{20}$ | 0 | 0 | 0 | 0 | 0 | 0 |
| CR | 0 | 0 | 0 | 0 | 0 | 0 | 0 | 0 | 0 |

(d) $t_3$

| | | | | | | | | | |
|---|---|---|---|---|---|---|---|---|---|
| FR2 | 0 | $1_{12}$ | $1_{11}$ | $1_{10}$ | 0 | 0 | 0 | 0 | 0 |
| FR3 | $1_{13}$ | $1_{22}$ | $1_{21}$ | $1_{20}$ | 0 | 0 | 0 | 0 | 0 |
| CR | 0 | 0 | 0 | 0 | 0 | 0 | 0 | 0 | 0 |

(e) $t_4$

| | | | | | | | | | |
|---|---|---|---|---|---|---|---|---|---|
| FR2 | 0 | 0 | $1_{12}$ | $1_{11}$ | $1_{10}$ | 0 | 0 | 0 | 0 |
| FR3 | $1_{14}$ | $1_{13}$ | $1_{22}$ | $1_{21}$ | $1_{20}$ | 0 | 0 | 0 | 0 |
| CR | 0 | 0 | 0 | 0 | 0 | 0 | 0 | 0 | 0 |

(f) $t_5$

| | | | | | | | | | |
|---|---|---|---|---|---|---|---|---|---|
| FR2 | 0 | 0 | 0 | $1_{12}$ | $1_{11}$ | $1_{10}$ | 0 | 0 | 0 |
| FR3 | $1_{15}$ | $1_{14}$ | $1_{13}$ | $1_{22}$ | $1_{21}$ | $1_{20}$ | 0 | 0 | 0 |
| CR | 0 | 0 | 0 | 0 | 0 | 0 | 0 | 0 | 0 |

(g) $t_8$

| | | | | | | | | | |
|---|---|---|---|---|---|---|---|---|---|
| FR2 | 0 | 0 | 0 | 0 | 0 | 0 | $1_{12}$ | $1_{11}$ | $1_{10}$ |
| FR3 | 0 | 0 | 0 | $1_{15}$ | $1_{14}$ | $1_{13}$ | $1_{22}$ | $1_{21}$ | $1_{20}$ |
| CR | 0 | 0 | 0 | 0 | 0 | 0 | 0 | 0 | 0 |

At time $t_1$ of the second read period, bit $1_{21}$ appears on the INFORMATION lead accompanied by a low sprocket pulse. This bit is placed into position 8 of FR3, while the bits at the outputs of the frame registers are transferred to the inputs of the next lower numbered frame registers. Consequently, at the conclusion of time $t_1$ the configuration of frame registers 2 and 3 is as shown in part (b) of Table 2. Frame registers 0 and 1 each contains all 0's as in part (a) of the table.

During $t_2$ of the second read period, information bit $1_{22}$ is placed into position 8 of FR3 while bit $1_{12}$ is transferred from the output of FR3 to position 8 of FR2. The contents of all of the frame registers and the control register have been shifted to the right one place in order to make room for these bits.

During time $t_3$, the next bit appearing on the INFORMATION conductor is $1_{13}$ which is taken from channel 3 of the first Start Pattern frame. This bit is also entered into position 8 of FR3 in the manner previously described for the earlier bits. At the same time, the output 0 bit appearing from FR3 is transferred into position 8 of FR2, thus displacing bit $1_{12}$ which moves to the seventh position of this register. During times $t_4$ and $t_5$ of the second read period, bits $1_{14}$ an $1_{15}$ are consecutively placed into FR3 in the manner shown in parts (e) and (f) of Table 2. During times $t_6$, $t_7$, and $t_8$, all registers recirculate since there are no Sprocket pulses. Therefore, the register configuration at the end of $t_8$ is as shown in part (g) of Table 2. Frame registers FR1 and FR0 still contain all 0's. Time $t_8$ concludes the second read period.

Tables 3 and 4 below indicate the configuration of the frame and control registers during various times of the third and fourth read periods, respectively. As may be seen from FIGURE 3 and Table 3, during the third read period the bits of three different Start Pattern frames are read and entered into the deskew registers. These bits, in the order of their appearance on the INFORMATION line, are as follows: $1_{30}$, $1_{31}$, $1_{32}$, $1_{23}$, $1_{24}$, $1_{25}$, $1_{16}$, $1_{17}$, and $1_{18}$. All nine of these 1 bits are consecutively entered into FR3 during respective time slots $t_0$ through $t_8$ such that, at the conclusion of $t_8$, bit $1_{30}$ occupies position 0 of FR3.

*Table 3.—Read period 3*

(a) $t_0$

| Register | 8 | 7 | 6 | 5 | 4 | 3 | 2 | 1 | 0 |
|---|---|---|---|---|---|---|---|---|---|
| FR0 | 0 | 0 | 0 | 0 | 0 | 0 | 0 | 0 | 0 |
| FR1 | $1_{10}$ | 0 | 0 | 0 | 0 | 0 | 0 | 0 | 0 |
| FR2 | $1_{20}$ | 0 | 0 | 0 | 0 | 0 | 0 | $1_{12}$ | $1_{11}$ |
| FR3 | $1_{30}$ | 0 | 0 | 0 | $1_{15}$ | $1_{14}$ | $1_{13}$ | $1_{22}$ | $1_{21}$ |
| CR | 0 | 0 | 0 | 0 | 0 | 0 | 0 | 0 | 0 |

(b) $t_3$

| | | | | | | | | | |
|---|---|---|---|---|---|---|---|---|---|
| FR1 | 0 | $1_{12}$ | $1_{11}$ | $1_{10}$ | 0 | 0 | 0 | 0 | 0 |
| FR2 | $0_{13}$ | $1_{22}$ | $1_{21}$ | $1_{20}$ | 0 | 0 | 0 | 0 | 0 |
| FR3 | $1_{23}$ | $1_{32}$ | $1_{31}$ | $1_{30}$ | 0 | 0 | 0 | $1_{15}$ | $1_{14}$ |
| CR | 0 | 0 | 0 | 0 | 0 | 0 | 0 | 0 | 0 |

(c) $t_6$

| | | | | | | | | | |
|---|---|---|---|---|---|---|---|---|---|
| FR1 | 0 | 0 | 0 | 0 | $1_{12}$ | $1_{11}$ | $1_{10}$ | 0 | 0 |
| FR2 | 0 | $1_{15}$ | $1_{14}$ | $1_{13}$ | $1_{22}$ | $1_{21}$ | $1_{20}$ | 0 | 0 |
| FR3 | $1_{16}$ | $1_{25}$ | $1_{24}$ | $1_{23}$ | $1_{32}$ | $1_{31}$ | $1_{30}$ | 0 | 0 |
| CR | 0 | 0 | 0 | 0 | 0 | 0 | 0 | 0 | 0 |

(d) $t_8$

| | | | | | | | | | |
|---|---|---|---|---|---|---|---|---|---|
| FR1 | 0 | 0 | 0 | 0 | 0 | 0 | $1_{12}$ | $1_{11}$ | $1_{10}$ |
| FR2 | 0 | 0 | 0 | $1_{15}$ | $1_{14}$ | $1_{13}$ | $1_{22}$ | $1_{21}$ | $1_{20}$ |
| FR3 | $1_{18}$ | $1_{17}$ | $1_{16}$ | $1_{25}$ | $1_{24}$ | $1_{23}$ | $1_{32}$ | $1_{31}$ | $1_{30}$ |

While entry of new information is being made into FR3, the outputs of FR3, FR2, and FR1 are transferred to the inputs of FR2, FR1, and FR0 in the manner previously described. Part (d) of Table 3 shows the final configuration of the loops at the conclusion of the third read period, with register FR0 still containing all 0's. Furthermore, register CR also contains all 0's because of the operation of gate $25_3$ in FIGURE 5.

During the fourth read period, bits from the fourth, third, and second Start Pattern frames are placed into FR3 in this order, with the transfer between loops being accomplished in the manner previously described. Time $t_0$ of the fourth read period occurs at the time that bits $1_{30}$, $1_{20}$, and $1_{10}$ are emerging from the outputs of FR3, FR2, and FR1, respectively. Therefore, part (a) of Table 4 shows the configuration of the loops at the conclusion of $t_0$ after a new bit $1_{40}$ has been placed into position 8 of FR3. Parts (b), (c) and (d) of Table 4 shows the configuration of the loops at the conclusion of times $t_3$, $t_6$ and $t_8$, respectively.

*Table 4.—Read period 4*

(a) $t_0$

| Register | 8 | 7 | 6 | 5 | 4 | 3 | 2 | 1 | 0 |
|---|---|---|---|---|---|---|---|---|---|
| FR0 | $1_{10}$ | 0 | 0 | 0 | 0 | 0 | 0 | 0 | 0 |
| FR1 | $1_{20}$ | 0 | 0 | 0 | 0 | 0 | 0 | $1_{12}$ | $1_{11}$ |
| FR2 | $1_{30}$ | 0 | 0 | 0 | $1_{15}$ | $1_{14}$ | $1_{13}$ | $1_{22}$ | $1_{21}$ |
| FR3 | $1_{40}$ | $1_{18}$ | $1_{17}$ | $1_{16}$ | $1_{25}$ | $1_{24}$ | $1_{23}$ | $1_{32}$ | $1_{31}$ |
| CR | 0 | 0 | 0 | 0 | 0 | 0 | 0 | 0 | 0 |

(b) $t_3$

| Register | 8 | 7 | 6 | 5 | 4 | 3 | 2 | 1 | 0 |
|---|---|---|---|---|---|---|---|---|---|
| FR0 | 0 | $1_{12}$ | $1_{11}$ | $1_{10}$ | 0 | 0 | 0 | 0 | 0 |
| FR1 | $1_{13}$ | $1_{22}$ | $1_{21}$ | $1_{20}$ | 0 | 0 | 0 | 0 | 0 |
| FR2 | $1_{23}$ | $1_{32}$ | $1_{31}$ | $1_{30}$ | 0 | 0 | 0 | $1_{15}$ | $1_{14}$ |
| FR3 | $1_{33}$ | $1_{42}$ | $1_{41}$ | $1_{40}$ | $1_{18}$ | $1_{17}$ | $1_{16}$ | $1_{25}$ | $1_{24}$ |
| CR | 0 | 0 | 0 | 0 | 0 | 0 | 0 | 0 | 0 |

(c) $t_6$

| Register | 8 | 7 | 6 | 5 | 4 | 3 | 2 | 1 | 0 |
|---|---|---|---|---|---|---|---|---|---|
| FR0 | 0 | 0 | 0 | 0 | $1_{12}$ | $1_{11}$ | $1_{10}$ | 0 | 0 |
| FR1 | 0 | $1_{15}$ | $1_{14}$ | $1_{13}$ | $1_{22}$ | $1_{21}$ | $1_{20}$ | 0 | 0 |
| FR2 | $1_{16}$ | $1_{25}$ | $1_{24}$ | $1_{23}$ | $1_{32}$ | $1_{31}$ | $1_{30}$ | 0 | 0 |
| FR3 | $1_{26}$ | $1_{35}$ | $1_{34}$ | $1_{33}$ | $1_{42}$ | $1_{41}$ | $1_{40}$ | $1_{18}$ | $1_{17}$ |
| CR | 0 | 0 | 0 | 0 | 0 | 0 | 0 | 0 | 0 |

(d) $t_8$

| Register | 8 | 7 | 6 | 5 | 4 | 3 | 2 | 1 | 0 |
|---|---|---|---|---|---|---|---|---|---|
| FR0 | 0 | 0 | 0 | 0 | 0 | 0 | $1_{12}$ | $1_{11}$ | $1_{10}$ |
| FR1 | 0 | 0 | 0 | $1_{15}$ | $1_{14}$ | $1_{13}$ | $1_{22}$ | $1_{21}$ | $1_{20}$ |
| FR2 | $1_{18}$ | $1_{17}$ | $1_{16}$ | $1_{25}$ | $1_{24}$ | $1_{23}$ | $1_{32}$ | $1_{31}$ | $1_{30}$ |
| FR3 | $1_{28}$ | $1_{27}$ | $1_{26}$ | $1_{35}$ | $1_{34}$ | $1_{33}$ | $1_{42}$ | $1_{41}$ | $1_{40}$ |
| CR | 0 | 0 | 0 | 0 | 0 | 0 | 0 | 0 | 0 |

It will now be appreciated from the above description of Tables 1 through 4 that the Start Pattern bits are all entered into FR3 from which they are eventually transferred upwards during successive read periods into frame registers 2, 1, and 0. During the fifth read period, bits $1_{10}$, $1_{11}$, and $1_{12}$ will be eliminated from FR0 and replaced by bits $1_{20}$, $1_{21}$, $1_{22}$, $1_{13}$, $1_{14}$, and $1_{15}$. The loss of these first three Start Pattern bits is of no consequence since they are not used by the utilization circuits. At the end of sixth read period, all of the frame registers FR0 through FR3 contain 1 bits in each of their nine positions, and that this configuration will be maintained until the first of the Start Sentinel bits are read during the twenty-sixth read period. It will also be evident from Table 4 that the bits from each of the Start Pattern frames are channel oriented, which means that each time slot in the frame registers operates without reference to the other time slots. A group of bits which are channel oriented is known as the channel configuration. A channel configuration may be defined as consisting of those bits in the frame registers which are assigned to the same tape channel. For example, refer to part (d) of Table 4 which shows the configuration of the registers at the conclusion of time $t_8$ of the fourth read period. At this time, positions 0 of the four frame registers hold the 1 bits found in channel 0 of the first four Start Pattern frames. That is, position 0 of FR0 contains the channel 0 bit of the first Start Pattern frame, position 0 of FR1 contains the channel 0 bit of the second Start Pattern frame and so on. In identical fashion, other given positions of the four frame registers contain given channel bits of different Start Pattern frames. Thus, position 1 of FR0 contains bit $1_{11}$, position 1 of FR0 holds bit $1_{21}$ and so on. It will also be noted that channel 0 bits are always associated with the time $t_0$ of a read period, channel 1 bits are always associated with time $t_1$ of a read period, and so on. Therefore, from part (d) of Table 4 it may be seen that the channel configuration for the time $t_0$ is 1111 as indicated from the bits held in positions 0 of the frame registers. Furthermore, this channel configuration for the $t_0$ time slot does not change during recirculation. That is to say, given channel bits from different frames will always be located in corresponding positions of the frame registers. If the contents of the frame registers are examined at one pulse time after time $t_8$ of the fourth read period (assuming recirculation), it is seen that bits $1_{10}$, $1_{20}$, $1_{30}$, and $1_{40}$ have recirculated from positions 0 of the frame registers to positions 8 of the frame registers, and that these four bits step in unison with one another as each traverses its respective delay loop. The same holds true for bits of the other configurations for channels 1 through 8.

In referring to FIGURE 3, it will be appreciated that the channel 0, 1, and 2 bits of the twenty-fifth Start Pattern frame are placed into FR3 during read period 25. During the same read period, channel 3, 4, and 5 bits of the twenty-fourth Start Pattern frame are likewise entered into FR3, as are channel 6, 7, and 8 bits of the twenty-third Start Pattern frame. When the twenty-sixth read period commences at time $t_0$, the first bit to be entered into the deskew circuit is that occupying channel 0 of the twenty-sixth frame. This twenty-sixth Start Pattern frame is the first frame of the three frame Start Sentinel shown in FIGURE 2. The 0 bit appears on the INFORMATION conductor at the same time that channel 0 bits appear from the outputs of FR3, FR2, FR1, and FR0. Because each of the Start Sentinel bits is also accompanied by a low Sprocket pulse, and because register CR still contains all 0's, the circuitry of FIGURE 7 operates as above described in order to generate the low TRANSFER signal and a high $\overline{\text{TRANSFER}}$ signal for each of the nine formation bits appearing serially on the INFORMATION conductor during the twenty-sixth read period. Hence, the new information is entered into FR3, and the previous content of each of the frame registers is transferred to the next lower numbered frame register. Part (a) of Table 5 shows the configuration of the register loops at the conclusion of time $t_0$ of the twenty-sixth read period.

*Table 5.—Read period 26*

(a) $t_0$

| Register | 8 | 7 | 6 | 5 | 4 | 3 | 2 | 1 | 0 |
|---|---|---|---|---|---|---|---|---|---|
| FR0 | $1_{30}$ | $1_{08}$ | $1_{07}$ | $1_{06}$ | $1_{15}$ | $1_{14}$ | $1_{13}$ | $1_{22}$ | $1_{21}$ |
| FR1 | $1_{40}$ | $1_{18}$ | $1_{17}$ | $1_{16}$ | $1_{25}$ | $1_{24}$ | $1_{23}$ | $1_{32}$ | $1_{31}$ |
| FR2 | $1_{50}$ | $1_{28}$ | $1_{27}$ | $1_{26}$ | $1_{35}$ | $1_{34}$ | $1_{33}$ | $1_{42}$ | $1_{41}$ |
| FR3 | $0_{60}$ | $1_{38}$ | $1_{37}$ | $1_{36}$ | $1_{45}$ | $1_{44}$ | $1_{43}$ | $1_{52}$ | $1_{51}$ |
| CR | 0 | 0 | 0 | 0 | 0 | 0 | 0 | 0 | 0 |

(b) $t_8$

| Register | 8 | 7 | 6 | 5 | 4 | 3 | 2 | 1 | 0 |
|---|---|---|---|---|---|---|---|---|---|
| FR0 | $1_{18}$ | $1_{17}$ | $1_{16}$ | $1_{25}$ | $1_{24}$ | $1_{23}$ | $1_{32}$ | $1_{31}$ | $1_{30}$ |
| FR1 | $1_{28}$ | $1_{27}$ | $1_{26}$ | $1_{35}$ | $1_{34}$ | $1_{33}$ | $1_{42}$ | $1_{41}$ | $1_{40}$ |
| FR2 | $1_{38}$ | $1_{37}$ | $1_{36}$ | $1_{45}$ | $1_{44}$ | $1_{43}$ | $1_{52}$ | $1_{51}$ | $1_{50}$ |
| FR3 | $1_{48}$ | $1_{47}$ | $1_{46}$ | $1_{55}$ | $1_{54}$ | $1_{51}$ | $1_{62}$ | $1_{61}$ | $0_{60}$ |
| CR | 0 | 0 | 0 | 0 | 0 | 0 | 0 | 0 | 0 |

For the sake of economy of space, the ten's order digit of the frame designation has been omitted from each subscript. For example, bit $1_{30}$ in position 8 of FR0 is the 1 bit found in channel 0 of the twenty-third Start Pattern frame. Similarly, bit $0_{60}$ shown in position 8 of frame register 3 represents the value 0 found in the channel 0 position of frame 26, which is the first frame of the Start Sentinel configuration. This shorter version of the subscript notation will be followed in all subsequent tables to be discussed.

During times $t_1$ through $t_7$ of the twenty-sixth read period, the following information bits in their order of appearance are entered into FR3: $0_{61}$, $0_{62}$, $1_{53}$, $1_{54}$, $1_{55}$, $1_{46}$, $1_{47}$. During the $t_8$ time slot of the read period, the information bit $1_{48}$ is entered into position 8 of FR3 such that the final configuration of the loops at the conclusion of time $t_8$ is as shown in part (b) of Table 5.

At the commencement of the twenty-seventh read period (time $t_0$), the first information bit $1_{70}$ appears on the INFORMATION line accompanied by a low Sprocket pulse. Simultaneously, bits $1_{30}$, $1_{40}$, $1_{50}$, and $0_{60}$ appear from the outputs of frame registers 1 through 3, respectively. The circuitry in FIGURE 7 operates as before so as to enter bit $1_{70}$ into position 8 of FR3, as well as transferring bit $0_{60}$ from FR3 to position 8 of FR2, $1_{50}$ from FR2 to position 8 of FR1, and $1_{40}$ from FR1 to position 8 of FR0. Part (a) of Table 6 shows the configuration of the loops at the conclusion of $t_0$ time during the twenty-seventh read period.

*Table 6.—Read period 27*

(a) $t_0$

| Register | 8 | 7 | 6 | 5 | 4 | 3 | 2 | 1 | 0 |
|---|---|---|---|---|---|---|---|---|---|
| FR0 | $1_{40}$ | $1_{18}$ | $1_{17}$ | $1_{16}$ | $1_{25}$ | $1_{24}$ | $1_{23}$ | $1_{32}$ | $1_{31}$ |
| FR1 | $1_{50}$ | $1_{28}$ | $1_{27}$ | $1_{26}$ | $1_{35}$ | $1_{34}$ | $1_{33}$ | $1_{42}$ | $1_{41}$ |
| FR2 | $0_{60}$ | $1_{38}$ | $1_{37}$ | $1_{36}$ | $1_{45}$ | $1_{44}$ | $1_{43}$ | $1_{52}$ | $1_{51}$ |
| FR3 | $1_{70}$ | $1_{48}$ | $1_{47}$ | $1_{46}$ | $1_{55}$ | $1_{54}$ | $1_{53}$ | $0_{62}$ | $0_{61}$ |
| CR | 0 | 0 | 0 | 0 | 0 | 0 | 0 | 0 | 0 |

(b) $t_8$

| Register | 8 | 7 | 6 | 5 | 4 | 3 | 2 | 1 | 0 |
|---|---|---|---|---|---|---|---|---|---|
| FR0 | $1_{28}$ | $1_{27}$ | $1_{26}$ | $1_{35}$ | $1_{34}$ | $1_{33}$ | $1_{42}$ | $1_{41}$ | $1_{40}$ |
| FR1 | $1_{38}$ | $1_{37}$ | $1_{36}$ | $1_{45}$ | $1_{44}$ | $1_{43}$ | $1_{52}$ | $1_{51}$ | $1_{50}$ |
| FR2 | $1_{48}$ | $1_{47}$ | $1_{46}$ | $1_{55}$ | $1_{54}$ | $1_{53}$ | $0_{62}$ | $0_{61}$ | $0_{60}$ |
| FR3 | $1_{58}$ | $1_{57}$ | $1_{56}$ | $0_{65}$ | $0_{64}$ | $0_{63}$ | $1_{72}$ | $1_{71}$ | $1_{70}$ |
| CR | 0 | 0 | 0 | 0 | 0 | 0 | 0 | 0 | 0 |

During the remaining portion of the twenty-seventh read period, frame register 3 is again filled with new information so that at the conclusion of $t_8$ time, the configuration is as shown in part (b) of Table 6. The new channel configuration for the $t_0$ time slot may be ascertained from the binary bit values held in positions 0 of the frame registers. This channel configuration at the conclusion of the twenty-seventh read period is 1101 reading from the top register FR0 to the bottom register FR3. In identical fashion, the channel configurations for the $t_1$ and $t_2$ time slots may be ascertained from part (b) of Table 6 by examining the bit values in positions 1 and positions 2 of the frame registers, respectively. These channel configurations are seen to be identical to the channel configuration for the $t_0$ time slot, i.e., 1101. However, the channel configuration for the $t_3$, $t_4$, and $t_5$ time slots is 1110 as shown by the bit values held in positions 3, 4, and 5 of the frame registers. The channel configuration for the $t_6$, $t_7$, and $t_8$ time slots is 1111.

At the conclusion of the twenty-seventh read period, it will be appreciated from an examination of Table 6 that the first two Start Sentinal bits from each of the tape channels 0, 1, and 2, have been placed into the deskew circuit. The remaining Start Sentinal bit in each of these channels will be placed into the frame registers during the next following read period 28. Thereafter, all information bits read from tape channels 0, 1, and 2 beginning with read period 29 must be Data bits which are to be used by the utilization circuit. Therefore, when the complete Start Sentinel configuration 011 for any of the tape channels is entered into the deskew circuit, a change must be effected in the mode of operation in order that the subsequent Data bits may be properly reassembled for ultimate transfer to the utilization circuits. The manner in which this is done will now be described.

The twenty-eighth read period commences at $t_0$ time with the arrival of bit $1_{80}$ on the INFORMATION line, accompanied by a low Sprocket pulse. At the initiation of $t_0$ time, the bits emerging from frame registers FR0, FR1, FR2, and FR3 are the following: $1_{40}$, $1_{50}$, $0_{60}$, and $1_{70}$, respectively. Furthermore, a 0 value is also emerging from CR at the commencement of the $t_0$ time. Thus, gate 56 in FIGURE 7 now has a low signal applied to each of its inputs, since the Start Sentinel flip-flop is still in its set condition. Consequently, a high output is generated from gate 56 which is labeled START SENTINEL DETECT. Gate 50 in FIGURE 7 also has applied to it all low inputs so that it, too, generates a high output which in turn produces the low TRANSFER signal and the high $\overline{\text{TRANSFER}}$ signal as was done during the previous twenty-seven read periods. In FIGURE 5 the TRANSFER and $\overline{\text{TRANSFER}}$ signals permit the introduction of bit $1_{80}$ into the eighth position of FR3 in the customary manner. These signals also attempt to enable the transfer gates 23 to transfer information upward between the frame registers. Thus, during time $t_0$ bit $1_{70}$ at the output of FR3 is transferred into position 8 of FR2. Bit $0_{60}$ from the output of FR2 is gated through gate $\mathbf{23_1}$ and would normally be placed into position 8 of FR1. However, it will be noted that the high signal START SENTINEL DETECT is now present during $t_0$ time. This high signal, when applied to gate $\mathbf{15_1}$, instead places a binary 1 bit into position 8 of FR1. Consequently, the bit $0_{60}$ is lost. Because of the low TRANSFER signal at this time, gate $\mathbf{23_0}$ would, under normal circumstances, also be enabled to pass bit $1_{50}$ from the output of FR1 into position 8 of FR0. However, the high signal START SENTINEL DETECT is further applied to gate $\mathbf{23_0}$ which prevents said enabling. Consequently, a 0 bit is placed into position 8 of FR0 since all three inputs to gate $\mathbf{15_0}$ now have low signals applied thereto. In FIGURE 6, the high START SENTINEL DETECT signal is further applied to gate 33 in order to generate a low output therefrom no matter what the polarity of the output from gate 34. The low output from gate 33 thereby introduces a binary 1 into position 8 of CR which heretofore had always been filled with a 0 bit from gate $\mathbf{25_3}$ in FIGURE 5. The configuration of the frame and control registers at the end of $t_0$ time of the twenty-eighth read period is shown in part (a) of Table 7.

*Table 7.—Read period 28*

(a) $t_0$

| Register | 8 | 7 | 6 | 5 | 4 | 3 | 2 | 1 | 0 |
|---|---|---|---|---|---|---|---|---|---|
| FR0 | 0 | $1_{28}$ | $1_{27}$ | $1_{26}$ | $1_{35}$ | $1_{34}$ | $1_{33}$ | $1_{42}$ | $1_{41}$ |
| FR1 | 1 | $1_{38}$ | $1_{37}$ | $1_{36}$ | $1_{45}$ | $1_{44}$ | $1_{43}$ | $1_{52}$ | $1_{51}$ |
| FR2 | $1_{70}$ | $1_{48}$ | $1_{47}$ | $1_{46}$ | $1_{55}$ | $1_{54}$ | $1_{53}$ | $0_{62}$ | $0_{61}$ |
| FR3 | $1_{80}$ | $1_{58}$ | $1_{57}$ | $1_{56}$ | $0_{65}$ | $0_{64}$ | $0_{63}$ | $1_{72}$ | $1_{71}$ |
| CR | 1 | 0 | 0 | 0 | 0 | 0 | 0 | 0 | 0 |

(b) $t_1$

| Register | 8 | 7 | 6 | 5 | 4 | 3 | 2 | 1 | 0 |
|---|---|---|---|---|---|---|---|---|---|
| FR0 | 0 | 0 | $1_{28}$ | $1_{27}$ | $1_{26}$ | $1_{35}$ | $1_{34}$ | $1_{33}$ | $1_{42}$ |
| FR1 | 1 | 1 | $1_{38}$ | $1_{37}$ | $1_{36}$ | $1_{45}$ | $1_{44}$ | $1_{43}$ | $1_{52}$ |
| FR2 | $1_{71}$ | $1_{70}$ | $1_{48}$ | $1_{47}$ | $1_{46}$ | $1_{55}$ | $1_{54}$ | $1_{53}$ | $0_{62}$ |
| FR3 | $1_{81}$ | $1_{80}$ | $1_{58}$ | $1_{57}$ | $1_{56}$ | $0_{65}$ | $0_{64}$ | $0_{63}$ | $1_{72}$ |
| CR | 1 | 1 | 0 | 0 | 0 | 0 | 0 | 0 | 0 |

(c) $t_2$

| Register | 8 | 7 | 6 | 5 | 4 | 3 | 2 | 1 | 0 |
|---|---|---|---|---|---|---|---|---|---|
| FR0 | 0 | 0 | 0 | $1_{28}$ | $1_{27}$ | $1_{26}$ | $1_{35}$ | $1_{34}$ | $1_{33}$ |
| FR1 | 1 | 1 | 1 | $1_{38}$ | $1_{37}$ | $1_{36}$ | $1_{45}$ | $1_{44}$ | $1_{43}$ |
| FR2 | $1_{72}$ | $1_{71}$ | $1_{70}$ | $1_{48}$ | $1_{47}$ | $1_{46}$ | $1_{55}$ | $1_{54}$ | $1_{53}$ |
| FR3 | $1_{82}$ | $1_{81}$ | $1_{80}$ | $1_{58}$ | $1_{57}$ | $1_{56}$ | $0_{65}$ | $0_{64}$ | $0_{63}$ |
| CR | 1 | 1 | 1 | 0 | 0 | 0 | 0 | 0 | 0 |

(d) $t_8$

| Register | 8 | 7 | 6 | 5 | 4 | 3 | 2 | 1 | 0 |
|---|---|---|---|---|---|---|---|---|---|
| FR0 | $1_{38}$ | $1_{37}$ | $1_{36}$ | $1_{45}$ | $1_{44}$ | $1_{43}$ | 0 | 0 | 0 |
| FR1 | $1_{48}$ | $1_{47}$ | $1_{46}$ | $1_{55}$ | $1_{54}$ | $1_{53}$ | 1 | 1 | 1 |
| FR2 | $1_{58}$ | $1_{57}$ | $1_{56}$ | $0_{65}$ | $0_{64}$ | $0_{63}$ | $1_{72}$ | $1_{71}$ | $1_{70}$ |
| FR3 | $0_{68}$ | $0_{67}$ | $0_{66}$ | $1_{75}$ | $1_{74}$ | $1_{73}$ | $1_{82}$ | $1_{81}$ | $1_{80}$ |
| CR | 0 | 0 | 0 | 0 | 0 | 0 | 1 | 1 | 1 |

At the beginning of $t_1$ time of the twenty-eighth read period, bit $1_{81}$ appears on the INFORMATION line while bits $1_{41}$, $1_{51}$, $0_{61}$ and $1_{71}$ appear from the outputs of frame registers 0, 1, 2, and 3, respectively. This bit configuration appearing from the outputs of the frame registers, when coupled with a 0 bit from CR, again permits gate 56 in FIGURE 7 to generate a high signal which forces a binary 0 value into position 8 of FR0 and a 1 bit value into position 8 of FR1 in the manner described in connection with time $t_0$. A low TRANSFER signal and a high $\overline{\text{TRANSFER}}$ signal are likewise generated to place bit $1_{81}$ into position 8 of FR3, with a transfer of bit $1_{71}$ being effected from the output of FR3 to the input of FR2. Similarly, the high signal START SENTINEL DETECT is applied to gate 33 in FIGURE 6 to force a 1 into position 8 of CR. The result of this operation during time $t_1$ is shown in part (b) of Table 7.

At the commencement of time $t_2$ of the twenty-eighth read period, identical functions occur as during times $t_0$ and $t_1$. The bit configuration 11010 from FR0, FR1, FR2, FR3 and CR, respectively, also permits the generation of a high signal from gate 56 at the time that bit $1_{82}$ appears on the INFORMATION line accompanied by a low Sprocket pulse. Consequently, the register configuration at the end of time $t_2$ is as shown in part (c) of Table 7.

By referring to part (c) of Table 7, it will now be appreciated that at the commencement of time $t_3$, the bit configuration emerging from the frame registers and from CR is 11100 which will be ineffective to generate a high signal from gate 56 in FIGURE 7. However, the low TRANSFER and high $\overline{\text{TRANSFER}}$ signals are still generated in order to enter the next information bit $1_{82}$ into position 8 of FR3. These two signals also permit the transfer of bits from the outputs of FR3, FR2, and FR1 into positions 8 of FR2, FR1, and FR0, respectively, so that the operation commencing at time $t_3$ is as previously described in connection with read periods 1 through 27. Furthermore, the absence of the high START SENTINEL DETECT pulse at the input of gate 33 allows the ENTER 0 signal from gate $25_3$ to place a 0 into position 8 of CR.

During the remaining time intervals $t_3$ to $t_8$ of the twenty-eighth read period, information bits $1_{73}$, $1_{74}$, $1_{75}$, $0_{66}$, $0_{67}$, and $0_{68}$ in this order are read into FR3. From part (c) of Table 7, it will be noted that the configuration 1101 will not appear at the outputs of frame registers 0 through 3, respectively, for these last six time intervals. Therefore, gate 56 in FIGURE 7 cannot generate a high signal at these times. Consequently, transfer between frame registers is accomplished as during the first twenty-seven read periods, with the configuration of the registers at the conclusion of time $t_8$ being that shown in part (d) of Table 7.

Referring further to part (d) of Table 7, it will be observed that the channel 0 configuration at the conclusion of the twenty-eighth read period is 01111. This configuration is seen from an examination of positions 0 of the frame and control registers at the conclusion of time $t_8$. In like fashion, the channel configuration for channels 1 and 2 are also 01111 since these are the bit values held by positions 1 and 2, respectively, of the frame and control registers. The channel configuration for time slots $t_3$, $t_4$, and $t_5$ is 11010, whereas the channel configuration for time slots $t_6$, $t_7$, and $t_8$ is 11100.

During read period 29, the Read and Synchronizing circuits generate a train of signals which represent the following Information bits in this order: $d_{10}$, $d_{11}$, $d_{12}$, $1_{83}$, $1_{84}$, $1_{85}$, $1_{76}$, $1_{77}$, and $1_{78}$. The first three bits received on the INFORMATION line are from respective tape channels 0, 1, and 2 of the first Data frame. These Data bits may have either a value of binary 1 or a 0. The next following three bits are from the third Start Sentinel frame, channels 3, 4, and 5. The last three bits appearing in the serial pulse train are from the Second Start Sentinel frame, channels 6, 7, and 8.

As before indicated, Data must be frame oriented such that each frame register stores the bits of the same given Data frame. Incoming Data bits may be read directly into any one of the four frame registers depending upon the given frame to which the particular Data bit belongs. So-called "read-in spots" determine the frame register to which a Data bit should be assigned. Read-in spots are channel oriented, there being only one read-in spot for each of the nine channel configurations in the deskew circuit. The read-in spot always appears as a 0, while the other bits in the channel configuration consist of either Data or 1 bits. Although Data bits also appear as 1's or 0's, the logic is such that there can be no confusion between a read-in spot and a 0 data bit.

Referring again to part (d) of Table 7, each of the three 0 bits in FRO at the conclusion of read period 28 constitutes a read-in spot which will be utilized during read-in period 29 in order to place the three Data bits $d_{10}$, $d_{11}$, and $d_{12}$ into FR0. It will be appreciated that these three values in FR0 are associated with the time slots $t_0$, $t_1$, and $t_2$, respectively, which in turn are the time slots assigned to tape channels 0, 1 and 2. It is from these three tape channels that the Data bits $d_{10}$, $d_{11}$, and $d_{12}$ will be read during read period 29. The manner in which the read-in spots effect entry of FR0 will now be described in connection with the discussion of read period 29.

When read period 29 commences at time $t_0$, bit $d_{10}$ appears on the INFORMATION line accompanied by a low Sprocket pulse. The following bits also appear at the outputs of the frame registers 0, 1, 2, and 3 and the control register: 0, 1, $1_{70}$, $1_{80}$, and 1, respectively. Since a 1 bit is now emerging from pulse former 32 of CR, the signal $\overline{\text{R4}}$ is high and so forces gates 50 and 56 in FIGURE 7 to generate low signals therefrom. The low signal from gate 50 produces a high signal from gate 51 and a low signal from gate 52. The low $\overline{\text{TRANSFER}}$ signal, coupled with a low signal from gate $26_3$ in FIGURE 5, causes gate $24_3$ to generate a high output which thus inhibits gate $16_3$ from passing the Information bit $d_{10}$ into FR3. The negative $\overline{\text{TRANSFER}}$ signal further enables gates 17 to recirculate the register contents. Furthermore, the high TRANSFER signal applied to gates 23 prevents a bit appearing at the output of a frame register from being transferred into the next lower numbered frame register. Consequently, during $t_0$ the bit $1_{80}$ at the output of pulse former $11_3$ is recirculated and placed into position 8 of the same frame register 3 from which it was taken. The recirculation of this bit $1_{80}$ creates a high output from gate $21_3$ which in turn generates a low output from gate $18_3$. In similar fashion, bit $1_{70}$ at the output of FR2 is recirculated via gates $21_2$, $18_2$, $19_2$, $20_2$, and $17_2$ in order to be placed into position 8 of FR2 during time $t_0$ of this twenty-ninth read period. This recirculation of this 1 bit causes a low output to appear from gate $18_2$. In loop FR1, a 1 bit also emerges from pulse former $11_1$ and is applied to gate $21_1$ for an attempted re-entry back into position 8 of FR1. Therefore, gate $18_1$ produces a low output signal along with the low output signals from gates $18_2$ and $18_3$. These three low signals are applied to three of the inputs of gate $26_0$ shown in FIGURE 5. Referring now to FIGURE 6, it will be noted that the binary 1 appearing from pulse former 32 causes a low signal from gate 37 whose output is labeled R4'. Furthermore, the signal R4 is also low since it is taken from the — terminal of pulse former 32 in FIGURE 6. R4 is applied to gate 54 in FIGURE 7 along with the low Sprocket pulse which accompanies the Information bit $d_{10}$. With both of its inputs low at this time, gate 54 produces a high output which in turn generates from gate 53 a low signal labeled Data Sprocket. Both R4' and Data Sprocket signals are applied to all of the gates 26 in FIGURE 5.

It is now seen that during time $t_0$ of read period 29, gate $26_0$ has low signals applied to all of its inputs. This in turn generates a high output therefrom which, when inverted by gate $24_0$, applies a low signal to one input of gate $16_0$. This low signal enables gate $16_0$ to pass the bit $d_{10}$ appearing on the Information line into position 8 of FR0. Consequently, Data bit $d_{10}$ is inserted into the topmost frame register instead of into FR3. In addition, the negative signal from gate $24_0$ is inverted by gate $25_0$ which thereupon applies a high signal to gate $17_1$. At this time, the Start Sentinel Detect signal is also low since gate 56 in FIGURE 7 does not have all inputs thereto of low polarity. Furthermore, because the TRANSFER signal is high, gate $23_1$ is also low. Gate $16_1$ has a low output since the output from gate $24_1$ is high at this time due to the fact that not all of the inputs to gate $26_1$ are low. This is so, since the binary 1 bit from the output of FR1 is applied to gate $21_1$ at this time so as to produce a high signal from gate $19_1$. Consequently, with all of its inputs low, gate $15_1$ generates a high signal which introduces a binary 0 into position 8 of FR1. This is the case even though a binary 1 bit appears at the output of pulse former $11_1$.

The configuration of the frame and control registers at the end of time $t_0$ of the twenty-ninth read period may be seen in part (a) of Table 8.

*Table 8.—Read period 29*

(a) $t_0$

| Register | 8 | 7 | 6 | 5 | 4 | 3 | 2 | 1 | 0 |
|---|---|---|---|---|---|---|---|---|---|
| FR0 | $d_{10}$ | $1_{38}$ | $1_{37}$ | $1_{36}$ | $1_{45}$ | $1_{44}$ | $1_{43}$ | 0 | 0 |
| FR1 | 0 | $1_{48}$ | $1_{47}$ | $1_{46}$ | $1_{55}$ | $1_{54}$ | $1_{53}$ | 1 | 1 |
| FR2 | $1_{70}$ | $1_{58}$ | $1_{57}$ | $1_{56}$ | $0_{65}$ | $0_{64}$ | $0_{63}$ | $1_{72}$ | $1_{71}$ |
| FR3 | $1_{80}$ | $0_{68}$ | $0_{67}$ | $0_{66}$ | $1_{75}$ | $1_{74}$ | $1_{73}$ | $1_{82}$ | $1_{81}$ |
| CR | 1 | 0 | 0 | 0 | 0 | 0 | 0 | 1 | 1 |

(b) $t_2$

| Register | 8 | 7 | 6 | 5 | 4 | 3 | 2 | 1 | 0 |
|---|---|---|---|---|---|---|---|---|---|
| FR0 | $d_{12}$ | $d_{11}$ | $d_{10}$ | $1_{38}$ | $1_{37}$ | $1_{36}$ | $1_{45}$ | $1_{44}$ | $1_{43}$ |
| FR1 | 0 | 0 | 0 | $1_{48}$ | $1_{47}$ | $1_{46}$ | $1_{55}$ | $1_{54}$ | $1_{53}$ |
| FR2 | $1_{72}$ | $1_{71}$ | $1_{70}$ | $1_{58}$ | $1_{57}$ | $1_{56}$ | $0_{65}$ | $0_{64}$ | $0_{63}$ |
| FR3 | $1_{82}$ | $1_{81}$ | $1_{80}$ | $0_{68}$ | $0_{67}$ | $0_{66}$ | $1_{75}$ | $1_{74}$ | $1_{73}$ |
| CR | 1 | 1 | 1 | 0 | 0 | 0 | 0 | 0 | 0 |

(c) $t_3$

| Register | 8 | 7 | 6 | 5 | 4 | 3 | 2 | 1 | 0 |
|---|---|---|---|---|---|---|---|---|---|
| FR0 | 0 | $d_{12}$ | $d_{11}$ | $d_{10}$ | $1_{38}$ | $1_{37}$ | $1_{36}$ | $1_{45}$ | $1_{44}$ |
| FR1 | 1 | 0 | 0 | 0 | $1_{48}$ | $1_{47}$ | $1_{46}$ | $1_{55}$ | $1_{54}$ |
| FR2 | $1_{73}$ | $1_{72}$ | $1_{71}$ | $1_{70}$ | $1_{58}$ | $1_{57}$ | $1_{56}$ | $0_{65}$ | $0_{64}$ |
| FR3 | $1_{83}$ | $1_{82}$ | $1_{81}$ | $1_{80}$ | $0_{68}$ | $0_{67}$ | $0_{66}$ | $1_{75}$ | $1_{74}$ |
| CR | 1 | 1 | 1 | 1 | 0 | 0 | 0 | 0 | 0 |

(d) $t_5$

| Register | 8 | 7 | 6 | 5 | 4 | 3 | 2 | 1 | 0 |
|---|---|---|---|---|---|---|---|---|---|
| FR0 | 0 | 0 | 0 | $d_{12}$ | $d_{11}$ | $d_{10}$ | $1_{38}$ | $1_{37}$ | $1_{36}$ |
| FR1 | 1 | 1 | 1 | 0 | 0 | 0 | $1_{48}$ | $1_{47}$ | $1_{46}$ |
| FR2 | $1_{75}$ | $1_{74}$ | $1_{73}$ | $1_{72}$ | $1_{71}$ | $1_{70}$ | $1_{58}$ | $1_{57}$ | $1_{56}$ |
| FR3 | $1_{85}$ | $1_{84}$ | $1_{83}$ | $1_{82}$ | $1_{81}$ | $1_{80}$ | $0_{68}$ | $0_{67}$ | $0_{66}$ |
| CR | 1 | 1 | 1 | 1 | 1 | 1 | 0 | 0 | 0 |

(e) $t_6$

| Register | 8 | 7 | 6 | 5 | 4 | 3 | 2 | 1 | 0 |
|---|---|---|---|---|---|---|---|---|---|
| FR0 | $1_{36}$ | 0 | 0 | 0 | $d_{12}$ | $d_{11}$ | $d_{10}$ | $1_{38}$ | $1_{37}$ |
| FR1 | $1_{56}$ | 1 | 1 | 1 | 0 | 0 | 0 | $1_{48}$ | $1_{47}$ |
| FR2 | $0_{66}$ | $1_{75}$ | $1_{74}$ | $1_{73}$ | $1_{72}$ | $1_{71}$ | $1_{70}$ | $1_{58}$ | $1_{57}$ |
| FR3 | $1_{76}$ | $1_{85}$ | $1_{84}$ | $1_{83}$ | $1_{82}$ | $1_{81}$ | $1_{80}$ | $0_{68}$ | $0_{67}$ |
| CR | 0 | 1 | 1 | 1 | 1 | 1 | 1 | 0 | 0 |

(f) $t_8$

| Register | 8 | 7 | 6 | 5 | 4 | 3 | 2 | 1 | 0 |
|---|---|---|---|---|---|---|---|---|---|
| FR0 | $1_{48}$ | $1_{47}$ | $1_{46}$ | 0 | 0 | 0 | $d_{12}$ | $d_{11}$ | $d_{10}$ |
| FR1 | $1_{58}$ | $1_{57}$ | $1_{56}$ | 1 | 1 | 1 | 0 | 0 | 0 |
| FR2 | $0_{68}$ | $0_{67}$ | $0_{66}$ | $1_{75}$ | $1_{74}$ | $1_{73}$ | $1_{72}$ | $1_{71}$ | $1_{70}$ |
| FR3 | $1_{78}$ | $1_{77}$ | $1_{76}$ | $1_{85}$ | $1_{84}$ | $1_{83}$ | $1_{82}$ | $1_{81}$ | $1_{80}$ |
| CR | 0 | 0 | 0 | 1 | 1 | 1 | 1 | 1 | 1 |

The Data bit $d_{10}$ is in position 8 of FR0, whereas position 8 of FR1 contains a 0 value because of the high signal from gate $25_0$. Position 8 of FR2 holds bit $1_{70}$ which was recirculated unchanged from the output of FR2, whereas position 8 of FR3 likewise holds bit $1_{80}$ recirculated from its output. In the control register, the 1 bit coming from pulse former 32 at time $t_0$, as represented by a high signal from the + output terminal forces a low output from gate 35. At this time the ENTER 0 signal from gate $25_3$ in FIGURE 5 is also low because of a high output from gate $24_3$. Consequently, with two low inputs thereto, gate 34 generates a high output which in turn provides a low input signal to pulse former 30, thus entering a binary 1 back into the control register. This re-entered binary 1 in CR is likewise shown in part (a) of Table 8.

At $t_1$ time of the twenty-ninth read period, bit $d_{11}$ enters on the INFORMATION line accompanied by a low Sprocket pulse. Time $t_1$ begins when the following bits are emerging from the frame and control registers: 0, 1, $1_{71}$, $1_{81}$, and 1, respectively. Thus, the channel 1 configuration at the register outputs is 01111 which is the same channel configuration present during the commencement of time $t_0$. Consequently, gate $26_0$ is enabled to generate a high signal for placing bit $d_{11}$ into position 8 of FR0. Likewise, the high output from gate $25_0$ forces a 0 bit into position 8 of FR1, while bits $1_{71}$ and $1_{81}$ are recirculated from their respective registers FR2 and FR3 back into positions 8 of the same register. In like manner, the 1 bit from the output of CR is placed into its position 8.

At the beginning of time $t_2$, the same channel configuration 01111 appears from the frame and control registers as appeared during $t_0$ and $t_1$. Consequently, bit $d_{12}$ is placed into position 8 of FR0; a 0 value is forced into position 8 of FR1; and bits $1_{72}$, $1_{82}$ and 1 are respectively placed in positions 8 of FR2, FR3, and CR. Part (b) of Table 8 shows the register configurations at the conclusion of time $t_2$.

At the commencement of time $t_3$, bits $1_{43}$, $1_{53}$, $0_{63}$, $1_{73}$ and 0 are now emerging from the outputs of the frame and control registers. The fourth bit now appearing on the INFORMATION conductor is $1_{83}$, which completes the Start Sentinel configuration in tape channel 3. Referring now to FIGURE 7, it will be seen that since a binary 0 is emerging from CR at time $t_3$, the signals R4 and R4′ are both high so as to prevent generation of the low DATA SPROCKET signal. However, $\overline{\text{R4}}$ is low which, when coupled both with the low Sprocket pulse and the low output from pulse former 39, permits gate 50 to once again generate a high signal for production of the low TRANSFER signal and the high $\overline{\text{TRANSFER}}$ signal. Furthermore, gate 56 of FIGURE 7 recognizes the pattern 11010 from the frame and control register outputs, as well as recognizing the low signal on the INFORMATION conductor which represents bit $1_{83}$. Since all inputs to gate 56 are low at this time, the high START SENTINEL DETECT signal is once again generated. In FIGURE 5, the high DATA SPROCKET signal generates a low output from gate $26_0$ which in turn prevents gate $16_0$ from passing the bit now appearing on the INFORMATION conductor. Furthermore, the now high START SENTINEL DETECT signal forces a binary 0 value into position 8 of FR0 and forces a binary 1 value into position 8 of FR1 in the manner previously described. The now high $\overline{\text{TRANSFER}}$ signal produces a low output from gate $24_3$ which permits gate $16_3$ to enter bit $1_{83}$ into FR3. Furthermore, the now low TRANSFER signal permits bit $1_{73}$ to be placed into position 8 of FR2. The register configuration at the end of time $t_3$ is shown in part (c) of Table 8.

It is thus seen that commencing with time $t_3$ of the twenty-ninth read period, the start pattern mode of operation is once again initiated in order to continue placing the Start Sentinel bits into FR3. Thus, the twenty-ninth read period sees the deskew circuit operating in the Data mode during times $t_0$, $t_1$, and $t_2$, and operating in the Start Pattern mode for the remaining times. During times $t_4$ and $t_5$, the channel configuration emerging from the control and frame registers continues to be 11010 so that the resulting high output from gate 56 continues to force a 0 bit into position 8 of FR0, and a 1 bit into position 8 of FR1. At the same time, the entering Start Sentinel bits $1_{84}$ and $1_{85}$ are placed into FR3.

Since the START SENTINEL DETECT signal is high during time slots $t_3$, $t_4$, and $t_5$, 1 bits are also placed into the control register. Thus, in looking at part (d) of Table 8, which shows the register configuration at the end of the $t_5$ time slot, it will be seen that read-in spots (0 bit values) are not found in FR0 in the $t_3$, $t_4$ and $t_5$ time slots, which are those associated with tape channels 3, 4, and 5, respectively. On the other hand, the read-in spots associated with time slots $t_0$, $t_1$, and $t_2$ are now found in FR1, having been placed there from FR0 during the twenty-ninth read period. Consequently, during the thirtieth read period, subsequently to be rescribed, the Data frame bits from the INFORMATION line will be placed into either FR0 or FR1 according to the register position of the read-in spot at the time that the Data bit appears.

During the remaining part of the twenty-ninth read period, bits $1_{76}$, $1_{77}$, and $1_{78}$ are entered into FR3 in the manner previously described. Gate 56 cannot generate a high signal during these last three pulse times inasmuch as there is no 0 bit appearing from the output of FR2. The low START SENTINEL DETECT signal thereby permits the low TRANSFER signal and high $\overline{\text{TRANSFER}}$ signal to transfer bits from FR3, FR2 and FR1 into FR2, FR1 and FR0, respectively, without change. Since binary 0 bits also emerge from the control register output during times $t_6$, $t_7$, and $t_8$, the output from gate 35 in FIGURE 6 is high since the START SENTINEL FF is still set. The high signal from gate 35 produces a low signal from gate 34 which, when coupled with a low START SENTINEL DETECT signal, enters a binary 0 into the control register during each of these last three time slots. Therefore, part (f) of Table 8 shows the contents of the control and frame registers at the conclusion of $t_8$ time of the twenty-ninth read period.

During the thirtieth read period, time $t_0$ occurs when the following bits are emerging from the frame and control registers: $d_{10}$, 0, $1_{70}$, $1_{80}$, and 1. The bit appearing on the INFORMATION conductor at this time is $d_{20}$, which is the channel 0 bit of the second Data frame. Since a binary 1 is now emerging from the control register, signals R4 and R4′ are low and high, respectively, which in turn cause generation of a low DATA SPROCKET signal, a high TRANSFER signal, and a low $\overline{\text{TRANSFER}}$ signal. Furthermore, since bits $1_{80}$ and $1_{70}$ are now being recirculated through respective gates $\mathbf{18_3}$ and $\mathbf{18_2}$, the outputs of these gates are low. Since R4 is low, R4′ is also low. In FR1, the 0 bit value emerging from pulse former $\mathbf{11_1}$ causes a low signal from gate $\mathbf{21_1}$, and a high signal from gate $\mathbf{18_1}$. Gate $\mathbf{19_1}$ produces a low signal. Therefore, it will be seen that all inputs to gate $\mathbf{26_1}$ are low at time $t_0$ so that the high output therefrom causes a low output from gate $\mathbf{24_1}$. This in turn enables gate $\mathbf{16_1}$ to enter bit $d_{20}$ into FR1. Since the output from gate $\mathbf{18_1}$ is high, gate $\mathbf{26_0}$ must generate a low signal which in turn applies a high signal to one input of gate $\mathbf{16_0}$, thus preventing it from entering bit $d_{20}$ into FR0.

As mentioned before, bits $1_{80}$ and $1_{70}$ are returned via respective gates $\mathbf{18_3}$ and $\mathbf{18_2}$ to gates $\mathbf{17_3}$ and $\mathbf{17_2}$ of their respective frame registers. Bit $1_{80}$ passes through gate $\mathbf{17_3}$ and into position 8 of FR3. However, the low output from gate $\mathbf{24_1}$ generates a high output from gate $\mathbf{25_1}$ which, when applied to gate $\mathbf{17_2}$, prevents a bit $1_{70}$ from entering into FR2. Instead, a 0 read-in spot is forced into position 8 of FR2. In FR0, the output bit $d_{10}$ is allowed to recirculate via gates $\mathbf{21_0}$, $\mathbf{18_0}$, $\mathbf{19_0}$, $\mathbf{20_0}$, and $\mathbf{17_0}$ in order to be re-entered into position 8 of FR0. In FIGURE 6, the 1 bit from pulse former 32 (represented by a high signal from the + output terminal) makes low the output of gate 35. Since the output of gate $\mathbf{24_3}$ in FIGURE 5 is high at this time, the ENTER 0 signal is low so that gate 34 produces a high output which in turn generates a low output from gate 33. Therefore, a binary 1 is placed into position 8 of the control register. Part (a) of Table 9 illustrates the register configuration at the end of the $t_0$ time slot of the thirtieth read period.

*Table 9.—Read period 30*

(a) $t_0$

| Register | 8 | 7 | 6 | 5 | 4 | 3 | 2 | 1 | 0 |
|---|---|---|---|---|---|---|---|---|---|
| FR0 | $d_{10}$ | $1_{48}$ | $1_{47}$ | $1_{46}$ | 0 | 0 | 0 | $d_{12}$ | $d_{11}$ |
| FR1 | $d_{20}$ | $1_{58}$ | $1_{57}$ | $1_{56}$ | 1 | 1 | 1 | 0 | 0 |
| FR2 | 0 | $0_{68}$ | $0_{67}$ | $0_{66}$ | $1_{75}$ | $1_{74}$ | $1_{73}$ | $1_{72}$ | $1_{71}$ |
| FR3 | $1_{80}$ | $1_{78}$ | $1_{77}$ | $1_{76}$ | $1_{85}$ | $1_{84}$ | $1_{83}$ | $1_{82}$ | $1_{81}$ |
| CR | 1 | 0 | 0 | 0 | 1 | 1 | 1 | 1 | 1 |

*Table 9*—Continued (b) $t_2$

| | | | | | | | | | |
|---|---|---|---|---|---|---|---|---|---|
| FR0 | $d_{12}$ | $d_{11}$ | $d_{10}$ | $1_{48}$ | $1_{47}$ | $1_{46}$ | 0 | 0 | 0 |
| FR1 | $d_{22}$ | $d_{21}$ | $d_{20}$ | $1_{58}$ | $1_{57}$ | $1_{56}$ | 1 | 1 | 1 |
| FR2 | 0 | 0 | 0 | $0_{68}$ | $0_{67}$ | $0_{66}$ | $1_{75}$ | $1_{74}$ | $1_{73}$ |
| FR3 | $1_{82}$ | $1_{81}$ | $1_{80}$ | $1_{78}$ | $1_{77}$ | $1_{76}$ | $1_{85}$ | $1_{84}$ | $1_{83}$ |
| CR | 1 | 1 | 1 | 0 | 0 | 0 | 1 | 1 | 1 |

(c) $t_3$

| | | | | | | | | | |
|---|---|---|---|---|---|---|---|---|---|
| FR0 | $d_{13}$ | $d_{12}$ | $d_{11}$ | $d_{10}$ | $1_{48}$ | $1_{47}$ | $1_{46}$ | 0 | 0 |
| FR1 | 0 | $d_{22}$ | $d_{21}$ | $d_{20}$ | $1_{58}$ | $1_{57}$ | $1_{56}$ | 1 | 1 |
| FR2 | $1_{73}$ | 0 | 0 | 0 | $0_{68}$ | $0_{67}$ | $0_{66}$ | $1_{75}$ | $1_{74}$ |
| FR3 | $1_{83}$ | $1_{82}$ | $1_{81}$ | $1_{80}$ | $1_{78}$ | $1_{77}$ | $1_{76}$ | $1_{85}$ | $1_{84}$ |
| CR | 1 | 1 | 1 | 1 | 0 | 0 | 0 | 1 | 1 |

(d) $t_6$

| | | | | | | | | | |
|---|---|---|---|---|---|---|---|---|---|
| FR0 | 0 | $d_{15}$ | $d_{14}$ | $d_{13}$ | $d_{12}$ | $d_{11}$ | $d_{10}$ | $1_{48}$ | $1_{47}$ |
| FR1 | 1 | 0 | 0 | 0 | $d_{22}$ | $d_{21}$ | $d_{20}$ | $1_{58}$ | $1_{57}$ |
| FR2 | $1_{76}$ | $1_{75}$ | $1_{74}$ | $1_{73}$ | 0 | 0 | 0 | $0_{68}$ | $0_{67}$ |
| FR3 | $1_{86}$ | $1_{85}$ | $1_{84}$ | $1_{83}$ | $1_{82}$ | $1_{81}$ | $1_{80}$ | $1_{78}$ | $1_{77}$ |
| CR | 1 | 1 | 1 | 1 | 1 | 1 | 1 | 0 | 0 |

(e) $t_8$

| | | | | | | | | | |
|---|---|---|---|---|---|---|---|---|---|
| FR0 | 0 | 0 | 0 | $d_{15}$ | $d_{14}$ | $d_{13}$ | $d_{12}$ | $d_{11}$ | $d_{10}$ |
| FR1 | 1 | 1 | 1 | 0 | 0 | 0 | $d_{22}$ | $d_{21}$ | $d_{20}$ |
| FR2 | $1_{78}$ | $1_{77}$ | $1_{76}$ | $1_{75}$ | $1_{74}$ | $1_{73}$ | 0 | 0 | 0 |
| FR3 | $1_{88}$ | $1_{87}$ | $1_{86}$ | $1_{85}$ | $1_{84}$ | $1_{83}$ | $1_{82}$ | $1_{81}$ | $1_{80}$ |
| CR | 1 | 1 | 1 | 1 | 1 | 1 | 1 | 1 | 1 |

From this will be appreciated the fact that for times $t_1$ and $t_2$, the same channel configuration 10111 emerges from the outputs of the frame registers and control register, so that the incoming data bits $d_{21}$ and $d_{22}$ are also entered into FR1. FR0 continues to recirculate its contents for these two time slots, while 0 read-in spots are likewise forced into FR2. FR3 also continues to recirculate, as does CR. Part (b) of Table 9 shows the loop configurations at the end of time slot $t_2$, where it is seen that the first three bits from the second Data frame have been placed into FR1. At this time FR0 also contains the first three bits from the first Data frame which were placed therein during the preceding twenty-ninth read period.

At times $t_3$, $t_4$, and $t_5$ of the thirtieth read period, the entering information bits are $d_{13}$, $d_{14}$, and $d_{15}$ which come from channels 3, 4, and 5 of the first Data frame. As the commencement of time $t_3$, it will be noted from part (b) of Table 9 that a 0 read-in spot once again appears from the output of FR0, accompanied by binary 1 bits from FR1, FR2, FR3 and CR. Consequently, gate $\mathbf{26_0}$ in FIGURE 5 is again enabled to generate a high output to enter the incoming bit $d_{13}$ into the eighth position of FR0. At the same time, the resulting high signal from gate $\mathbf{25_0}$ forces a 0 read-in spot into FR1 immediately following Data bit $d_{22}$, the latter having been placed into FR1 during the preceding time slot $t_2$. The channel configuration 01111 is also sampled during times $t_4$ and $t_5$ in order to likewise place Data frame bits $d_{14}$ and $d_{15}$ into FR0. Thus, it will be observed that the deskew circuit operates in the data mode for times $t_0$ through $t_5$ of the thirtieth read period in order to place Data bits of the same given frame into the same frame register. FR0 is consequently seen to be collecting all Data bits belonging to the first Data frame, whereas FR1 is collecting all bits belonging to the second Data frame. As has been emphasized, the determination of the frame register to which a given Data bit is sent depends upon the register location of that 0 read-in spot appearing at the time that the given Data bit appears on the INFORMATION input line.

At the commencement of time $t_6$ of the thirtieth read period, the output from CR is no longer a binary 1. Consequently, it is impossible to generate a low DATA SPROCKET signal from gate 53 in FIGURE 7. Since $\overline{\text{R4}}$ is low at this time, and since the Start Sentinel flip-flop is also still set, gate 50 produces a high signal for generating the low TRANSFER and high $\overline{\text{TRANSFER}}$ signals as was done during the previous Start Pattern read periods. However, at the beginning of $t_6$ the following bits are also emerging from FR0 through FR3, respectively: $1_{46}$, $1_{56}$, $0_{66}$, and $1_{76}$. Bit $1_{86}$ also appears on the INFORMATION conductor at time $t_6$. This is the last Start Sentinel frame bit to be found in channel 6. Consequently, gate 56 is enabled at this time to generate a high START SENTINEL DETECT signal which forces a 0 bit into the eighth position of FR0, and a 1 bit into the eighth position of FR1. The polarities of the TRANSFER and $\overline{\text{TRANSFER}}$ signals at this time also permit bit $1_{86}$ on the INFORMATION conductor to be entered into position 8 of FR3. The positive START SENTINEL DETECT signal further enters a binary 1 into CR. The configuration of the registers of the end of $t_6$ time is shown in part (d) of Table 9. In similar fashion, the channel configuration of 11010 during times $t_7$ and $t_8$ allows the remaining Start Sentinel bits $1_{87}$ and $1_{88}$ to be entered into FR3, with 0 read-in spots being placed into FR0. Hence, as shown by part (e) of Table 9, the configuration of the control register is all 1's with 0 read-in spots appearing in each of the frame registers FR0, FR1, and FR2. Since CR is now filled with binary 1's, pulse former 43 will subsequently operate in the manner described above to enable gate 42 to generate a high output in order to reset the Shift flip-flop in FIGURE 7. Consequently, the START SENTINEL signal becomes high to thereby insure prevention of any of the signals used during the Start Pattern mode.

During the thirty-first read period, as may be seen from FIGURE 3, the following bits are generated by the Read and Synchronizing circuit in this order: $d_{30}$, $d_{31}$, $d_{32}$, $d_{23}$, $d_{24}$, $d_{25}$, $d_{16}$, $d_{17}$, and $d_{18}$. The first three bits, belonging to the third Data frame, must be placed into frame register 2 whereas the second three bits belonging to Data frame 2 must be placed into frame register 1. The last three bits complete Data frame 1 and should be placed into frame register 0. This operation during the thirty-first read period is accomplished as follows. Since the control register now contains binary 1's in all of its positions, the signals R4 and R4′ are always low. For each time slot during the read period, a low DATA SPROCKET signal is generated from gate 53. At the commencement of time $t_0$, the bits appearing from the output of the frame and control registers consist of the following: $d_{10}$, $d_{20}$, 0, $1_{80}$, and 1, respectively. Bit $1_{80}$, during its recirculation back through gates $\mathbf{21_3}$ and $\mathbf{18_3}$, produces a low output from gate $\mathbf{18_3}$. The 0 bit appearing at the output of FR2 during time $t_0$ also causes a high output from gate $\mathbf{18_2}$, which in turn produces a low output from gate $\mathbf{19_2}$. Consequently, gate $\mathbf{26_2}$ generates a high output because of all low inputs. The high signal is inverted by gate $\mathbf{24_2}$ to allow gate $\mathbf{15_2}$ to enter the first appearing bit $d_{30}$ into position 8 of FR2. At the same time, the now high output from gate $\mathbf{25_2}$ is applied to gate $\mathbf{17_3}$ thus preventing the reinsertion of bit $1_{80}$ into FR3, and instead putting a binary 0 value into position 8 of this register. Frame register 0 and 1 recirculate their contents unimpaired. It will be noted that due to the high output from gate $\mathbf{18_2}$, gates $\mathbf{26_0}$ and $\mathbf{26_1}$ must generate low outputs which in turn block gates $\mathbf{16_0}$ and $\mathbf{16_1}$ from passing the information bit. In the control register of FIGURE 6, the output binary 1 is also recirculated back into position 8 of CR. The register contents at the end of this $t_0$ time are shown in part (a) of Table 10.

*Table 10.—Read period 31*

(a) $t_0$

| Register | 8 | 7 | 6 | 5 | 4 | 3 | 2 | 1 | 0 |
|---|---|---|---|---|---|---|---|---|---|
| FR0 | $d_{10}$ | 0 | 0 | 0 | $d_{15}$ | $d_{14}$ | $d_{13}$ | $d_{12}$ | $d_{11}$ |
| FR1 | $d_{20}$ | 1 | 1 | 1 | 0 | 0 | 0 | $d_{22}$ | $d_{21}$ |
| FR2 | $d_{30}$ | $1_{78}$ | $1_{77}$ | $1_{76}$ | $1_{75}$ | $1_{74}$ | $1_{73}$ | 0 | 0 |
| FR3 | 0 | $1_{88}$ | $1_{87}$ | $1_{86}$ | $1_{85}$ | $1_{84}$ | $1_{83}$ | $1_{82}$ | $1_{81}$ |
| CR | 1 | 1 | 1 | 1 | 1 | 1 | 1 | 1 | 1 |

*Table 10*—Continued (b) $t_3$

| | | | | | | | | | |
|---|---|---|---|---|---|---|---|---|---|
| FR0 | $d_{13}$ | $d_{12}$ | $d_{11}$ | $d_{10}$ | 0 | 0 | 0 | $d_{15}$ | $d_{14}$ |
| FR1 | $d_{23}$ | $d_{22}$ | $d_{21}$ | $d_{20}$ | 1 | 1 | 1 | 0 | 0 |
| FR2 | 0 | $d_{32}$ | $d_{31}$ | $d_{30}$ | $1_{78}$ | $1_{77}$ | $1_{76}$ | $1_{75}$ | $1_{74}$ |
| FR3 | $1_{83}$ | 0 | 0 | 0 | $1_{88}$ | $1_{87}$ | $1_{86}$ | $1_{85}$ | $1_{84}$ |
| CR | 1 | 1 | 1 | 1 | 1 | 1 | 1 | 1 | 1 |

(c) $t_6$

| | | | | | | | | | |
|---|---|---|---|---|---|---|---|---|---|
| FR0 | $d_{16}$ | $d_{15}$ | $d_{14}$ | $d_{13}$ | $d_{12}$ | $d_{11}$ | $d_{10}$ | 0 | 0 |
| FR1 | 0 | $d_{25}$ | $d_{24}$ | $d_{23}$ | $d_{22}$ | $d_{21}$ | $d_{20}$ | 1 | 1 |
| FR2 | $1_{76}$ | 0 | 0 | 0 | $d_{32}$ | $d_{31}$ | $d_{30}$ | $1_{78}$ | $1_{77}$ |
| FR3 | $1_{86}$ | $1_{85}$ | $1_{84}$ | $1_{83}$ | 0 | 0 | 0 | $1_{88}$ | $1_{87}$ |
| CR | 1 | 1 | 1 | 1 | 1 | 1 | 1 | 1 | 1 |

(d) $t_8$

| | | | | | | | | | |
|---|---|---|---|---|---|---|---|---|---|
| FR0 | $d_{18}$ | $d_{17}$ | $d_{16}$ | $d_{15}$ | $d_{14}$ | $d_{13}$ | $d_{12}$ | $d_{11}$ | $d_{10}$ |
| FR1 | 0 | 0 | 0 | $d_{25}$ | $d_{24}$ | $d_{23}$ | $d_{22}$ | $d_{21}$ | $d_{20}$ |
| FR2 | $1_{78}$ | $1_{77}$ | $1_{76}$ | 0 | 0 | 0 | $d_{32}$ | $d_{31}$ | $d_{30}$ |
| FR3 | $1_{88}$ | $1_{87}$ | $1_{86}$ | $1_{85}$ | $1_{84}$ | $1_{83}$ | 0 | 0 | 0 |
| CR | 1 | 1 | 1 | 1 | 1 | 1 | 1 | 1 | 1 |

During times $t_1$ and $t_2$ of the thirty-first read period, the channel configuration appearing at the outputs of the frame registers 2, 3, and CR is identical to the one appearing at time $t_0$, i.e., 011. Consequently, gate $\mathbf{26_2}$ produces a high signal each of these times which enables gate $\mathbf{16_2}$ to enter bits $d_{31}$ and $d_{32}$ into FR2. At the same time, 0 read-in spots are entered into FR3 because of the high signal from gate $\mathbf{25_2}$. Registers FR0, FR1, and CR recirculate their contents without change.

Beginning with $t_3$ of the read period now under consideration, the channel configuration from the registers changes such that the following bits appear from the outputs FR1, FR2, FR3, and CR, respectively: 0, $1_{73}$, $1_{83}$ and 1. The bit $d_{23}$ appears on the INFORMATION line accompanied by a low Sprocket pulse. Gate $\mathbf{26_2}$ in FIGURE 5 no longer produces a high output because of the recirculating bit $1_{74}$ which is now passing through gate $19_2$. However, because of the 0 bit from the output of gate $\mathbf{18_1}$, and the 1 bits from the outputs of gate $\mathbf{18_2}$ and $\mathbf{18_3}$, it is seen that gate $\mathbf{26_1}$ is once again energized to generate a high signal which, when inverted, allows $\mathbf{16_1}$ to enter bit $d_{23}$ into FR1. Consequently, the channel 3 bit of the second Data frame register joins other bits of the second Data frame in register FR1. Part (b) of Table 10 shows the register configuration at the end of time $t_3$, where registers FR0 and FR3 have recirculated their contents without change. The entry of $d_{23}$ into FR1 at this time also causes a 0 read-in spot to be placed into FR2 because of the high signal from gate $\mathbf{25_1}$. During times $t_4$ and $t_5$, the same channel bit configuration from the outputs of FR1, FR2, and FR3 permits data bits $d_{24}$ and $d_{25}$ to be entered into FR1, with the consequent forcing of 0 read-in spots into FR2.

Beginning with time $t_6$, the remaining bits of the first Data frame appear on the INFORMATION line. These must be placed into frame register 0 to complete the realignment of the first Data frame. For each time period $t_6$, $t_7$, and $t_8$, a 0 read-in spot appears at the output of FR0, together with 1 bit at the outputs of FR1, FR2 and FR3. Consequently, gate $\mathbf{26_0}$ produces a high output which enables bits $d_{16}$, $d_{17}$ and $d_{18}$ to be placed in FR0. For the same times, 0 read-in spots are put into FR1 immediately following the last data bit $d_{25}$ placed there during time interval 15. Part (e) of Table 10 shows the register configuration at the end of time $t_8$, wherein it is seen that the entire Data frame 1 has been read and reassembled in FR0. This Data frame is now read out to the utilization circuits during the next following read period 32 in the manner subsequently to be described.

From an examination of FIGURE 3, it will be seen that in read period 32 the following bits are entered into the deskew circuits in the following order: $d_{40}$, $d_{41}$, $d_{42}$, $d_{33}$, $d_{34}$, $d_{26}$, $d_{27}$ and $d_{28}$. The thirty-second read period begins with the commencement of $t_0$ during which time bit $d_{40}$ appears on the INFORMATION line accompanied by a low Sprocket pulse. The following bits also appear simultaneously from the outputs of the frame and control registers: $d_{10}$, $d_{20}$, $d_{30}$, 0, and 1. In FIGURE 7 a low DATA SPROCKET signal is generated from gate 53. The 0 bit at the output of FR3, represented by a high R3 signal, produces a low output from gate $\mathbf{21_3}$ which in turn combines with a low output from gate $\mathbf{22_3}$ to generate a high output from gate $\mathbf{18_3}$. Gate $\mathbf{19_3}$ in turn produces a low output which, when applied to gate $\mathbf{26_3}$, generates a high signal therefrom due to the fact that all of its input signals are low. The output from gate $\mathbf{24_3}$ is thereupon made low to permit gate $\mathbf{16_3}$ to enter the first bit $d_{40}$ into position 8 of FR3. It will be observed that the now high output from gate $\mathbf{18_3}$ causes each of the gates $\mathbf{26_0}$, $\mathbf{26_1}$ and $\mathbf{26_2}$ to generate a low output therefrom so as to prevent entry of bit $d_{40}$ into any one of the registers FR0, FR1, or FR2, respectively. Instead, these three frame registers recirculatte their contents unchanged.

The low output from $\mathbf{24_3}$ also produces a high ENTER 0 signal which makes low the output of gate 34 in FIGURE 6. Since the START SENTINEL DETECT signal is also low, the output of gate 33 becomes high thus entering a binary 0 value into position 8 of CR during the $t_0$ time of period 32. Consequently, the loop configurations are as shown in part (a) of Table 11 at the end of $t_0$.

*Table 11.—Read period 32*

(a) $t_0$

| Register | 8 | 7 | 6 | 5 | 4 | 3 | 2 | 1 | 0 |
|---|---|---|---|---|---|---|---|---|---|
| FR0 | $d_{10}$ | $d_{18}$ | $d_{17}$ | $d_{16}$ | $d_{15}$ | $d_{14}$ | $d_{13}$ | $d_{12}$ | $d_{11}$ |
| FR1 | $d_{20}$ | 0 | 0 | 0 | $d_{25}$ | $d_{24}$ | $d_{23}$ | $d_{22}$ | $d_{21}$ |
| FR2 | $d_{30}$ | $1_{78}$ | $1_{77}$ | $1_{76}$ | 0 | 0 | 0 | $d_{32}$ | $d_{31}$ |
| FR3 | $d_{40}$ | $1_{88}$ | $1_{87}$ | $1_{86}$ | $1_{85}$ | $1_{84}$ | $1_{83}$ | 0 | 0 |
| CR | 0 | 1 | 1 | 1 | 1 | 1 | 1 | 1 | 1 |

(b) $t_1$

| | | | | | | | | | |
|---|---|---|---|---|---|---|---|---|---|
| FR0 | $d_{21}$ | $d_{10}$ | $d_{18}$ | $d_{17}$ | $d_{16}$ | $d_{15}$ | $d_{14}$ | $d_{13}$ | $d_{12}$ |
| FR1 | $d_{31}$ | $d_{20}$ | 0 | 0 | 0 | $d_{25}$ | $d_{24}$ | $d_{22}$ | $d_{22}$ |
| FR2 | $d_{41}$ | $d_{30}$ | $1_{78}$ | $1_{77}$ | $1_{76}$ | 0 | 0 | 0 | $d_{32}$ |
| FR3 | 0 | $d_{40}$ | $1_{88}$ | $1_{87}$ | $1_{86}$ | $1_{85}$ | $1_{84}$ | $1_{83}$ | 0 |
| CR | 1 | 0 | 1 | 1 | 1 | 1 | 1 | 1 | 1 |

(c) $t_2$

| | | | | | | | | | |
|---|---|---|---|---|---|---|---|---|---|
| FR0 | $d_{22}$ | $d_{21}$ | $d_{10}$ | $d_{18}$ | $d_{17}$ | $d_{16}$ | $d_{15}$ | $d_{14}$ | $d_{13}$ |
| FR1 | $d_{32}$ | $d_{31}$ | $d_{20}$ | 0 | 0 | 0 | $d_{25}$ | $d_{24}$ | $d_{23}$ |
| FR2 | $d_{42}$ | $d_{41}$ | $d_{30}$ | $1_{78}$ | $1_{77}$ | $1_{76}$ | 0 | 0 | 0 |
| FR3 | 0 | 0 | $d_{40}$ | $1_{88}$ | $1_{87}$ | $1_{86}$ | $1_{85}$ | $1_{84}$ | $1_{83}$ |
| CR | 1 | 1 | 0 | 1 | 1 | 1 | 1 | 1 | 1 |

(d) $t_3$

| | | | | | | | | | |
|---|---|---|---|---|---|---|---|---|---|
| FR0 | $d_{23}$ | $d_{22}$ | $d_{21}$ | $d_{10}$ | $d_{18}$ | $d_{17}$ | $d_{16}$ | $d_{15}$ | $d_{14}$ |
| FR1 | $d_{33}$ | $d_{32}$ | $d_{31}$ | $d_{20}$ | 0 | 0 | 0 | $d_{25}$ | $d_{24}$ |
| FR2 | 0 | $d_{42}$ | $d_{41}$ | $d_{30}$ | $1_{78}$ | $1_{77}$ | $1_{76}$ | 0 | 0 |
| FR3 | 1 | 0 | 0 | $d_{40}$ | $1_{88}$ | $1_{87}$ | $1_{86}$ | $1_{85}$ | $1_{84}$ |
| CR | 1 | 1 | 1 | 0 | 1 | 1 | 1 | 1 | 1 |

(e) $t_5$

| | | | | | | | | | |
|---|---|---|---|---|---|---|---|---|---|
| FR0 | $d_{25}$ | $d_{24}$ | $d_{23}$ | $d_{22}$ | $d_{21}$ | $d_{10}$ | $d_{18}$ | $d_{17}$ | $d_{16}$ |
| FR1 | $d_{35}$ | $d_{34}$ | $d_{33}$ | $d_{32}$ | $d_{31}$ | $d_{20}$ | 0 | 0 | 0 |
| FR2 | 0 | 0 | 0 | $d_{42}$ | $d_{41}$ | $d_{30}$ | $1_{78}$ | $1_{77}$ | $1_{76}$ |
| FR3 | 1 | 1 | 1 | 0 | 0 | $d_{40}$ | $1_{88}$ | $1_{87}$ | $1_{86}$ |
| CR | 1 | 1 | 1 | 1 | 1 | 0 | 1 | 1 | 1 |

(f) $t_6$

| | | | | | | | | | |
|---|---|---|---|---|---|---|---|---|---|
| FR0 | $d_{26}$ | $d_{25}$ | $d_{24}$ | $d_{23}$ | $d_{22}$ | $d_{21}$ | $d_{10}$ | $d_{18}$ | $d_{17}$ |
| FR1 | 0 | $d_{35}$ | $d_{34}$ | $d_{33}$ | $d_{32}$ | $d_{31}$ | $d_{20}$ | 0 | 0 |
| FR2 | $1_{86}$ | 0 | 0 | 0 | $d_{42}$ | $d_{41}$ | $d_{30}$ | $1_{78}$ | $1_{77}$ |
| FR3 | 1 | 1 | 1 | 1 | 0 | 0 | $d_{40}$ | $1_{88}$ | $1_{87}$ |
| CR | 1 | 1 | 1 | 1 | 1 | 1 | 0 | 1 | 1 |

(g) $t_8$

| | | | | | | | | | |
|---|---|---|---|---|---|---|---|---|---|
| FR0 | $d_{28}$ | $d_{27}$ | $d_{26}$ | $d_{25}$ | $d_{24}$ | $d_{23}$ | $d_{22}$ | $d_{21}$ | $d_{10}$ |
| FR1 | 0 | 0 | 0 | $d_{35}$ | $d_{34}$ | $d_{33}$ | $d_{32}$ | $d_{31}$ | $d_{20}$ |
| FR2 | $1_{88}$ | $1_{87}$ | $1_{86}$ | 0 | 0 | 0 | $d_{42}$ | $d_{41}$ | $d_{30}$ |
| FR3 | 1 | 1 | 1 | 1 | 1 | 1 | 0 | 0 | $d_{40}$ |
| CR | 1 | 1 | 1 | 1 | 1 | 1 | 1 | 1 | 0 |

*Table 11*—Continued (h) $t_0'$

| | | | | | | | | | |
|---|---|---|---|---|---|---|---|---|---|
| FR0 | $d_{20}$ | $d_{28}$ | $d_{27}$ | $d_{26}$ | $d_{25}$ | $d_{24}$ | $d_{23}$ | $d_{22}$ | $d_{21}$ |
| FR1 | $d_{30}$ | 0 | 0 | 0 | $d_{35}$ | $d_{34}$ | $d_{33}$ | $d_{32}$ | $d_{31}$ |
| FR2 | $d_{40}$ | $1_{88}$ | $1_{87}$ | $1_{86}$ | 0 | 0 | 0 | $d_{42}$ | $d_{41}$ |
| FR3 | 0 | 1 | 1 | 1 | 1 | 1 | 1 | 0 | 0 |
| CR | 1 | 1 | 1 | 1 | 1 | 1 | 1 | 1 | 1 |

When the output of gate $\mathbf{26_3}$ is high during the aforementioned $t_0$ time, gate 27 thereby produces a low SET SHIFT signal which is applied to gate 60 of FIGURE 8. This low signal makes high the output of gate 60 which in turn makes low the output of gate 58. As before described, a low input to pulse former 57 sets the Shift flip-flop so that the output of its — terminal becomes low until the signal R4 goes high. However, at this particular time R4 remains low due to the issuance of a binary 1 from CR. The low SHIFT signal from pulse former 57 appears at the commencement of time $t_1$ of the thirty-second read period since there is a one pulse time delay through pulse former 57.

It will therefore be seen that at commencement of $t_1$ time of read period 32, the signal SHIFT is present in order to begin shifting the contents of FR0 into the utilization circuit. Gate 28 in FIGURE 5 is now responsive to the low signal SHIFT at this time to pass the bits from pulse former $\mathbf{11_0}$ into said utilization circuit. However, due to the one pulse time delay encountered through pulse former 57 of the Shift flip-flop, the first bit from FR0 to be sent to the utilization circuit is $d_{11}$, which appears at the output of FR0 at the beginning of time $t_1$.

In FIGURE 5, the now low SHIFT and the high $\overline{\text{SHIFT}}$ signals are applied to gates 22 and 21, respectively. The disabling of gates 21 thus prevents recirculation of information within a loop, whereas the enabling of gates 22 permits the shift of information from a frame register into the next lower numbered frame register. The low SHIFT signal is present for the duration of the thirty-second read period and one pulse time thereafter until the 0 bit placed into CR at $t_0$ time finally reaches the output of pulse former 32 where, as a high R4 signal, it is applied to gate 59 in FIGURE 8 so as to reset the Shift flip-flop.

Returning now to time $t_1$ of the thirty-second read period, it will be observed that the entering information bit is $d_{41}$, while the bits emerging from the frame and control registers are $d_{11}$, $d_{21}$, $d_{31}$, 0, and 1, respectively. The low SHIFT signal combines with the low R4 signal at gate $\mathbf{22_3}$ in order to produce a high output therefrom which in turn makes low the output of gate $\mathbf{18_3}$. This produces a high output from gate $\mathbf{19_3}$ which, via gates $\mathbf{26_3}$ and $\mathbf{24_3}$, prevents gate $\mathbf{16_3}$ from entering bit $d_{41}$ into FR3. Instead, the now low output from gate $\mathbf{18_3}$ is applied to gate $\mathbf{26_2}$ along with the low DATA SPROCKET and low R4′ signals. Furthermore, at the start of $t_1$ time the output R3 from FR3 is high because of the 0 bit emerging therefrom. This high signal makes low the output of gate $\mathbf{22_2}$. Since the $\overline{\text{SHIFT}}$ signal is high, the output of gate $\mathbf{21_2}$ is also low so that gate $\mathbf{18_2}$ becomes high and in turn makes low the output of gate $\mathbf{19_2}$. Consequently, it is seen that all inputs to gate $\mathbf{26_2}$ are low which in turn produce a high output therefrom and a low output from gate $\mathbf{24_2}$. This last low signal enables gate $\mathbf{16_2}$ to enter bit $d_{41}$ into the eighth position of FR2, and at the same time it enters a 0 bit into the eighth posiion of FR3 because of the now high signal from gate $\mathbf{25_2}$. Also at $t_1$ time, bit $d_{31}$ is shifted from the output of FR2 into FR1 via gate $\mathbf{22_1}$. In like fashion the output bit $d_{21}$ from FR1 is shifted into FR0 via gate $\mathbf{22_0}$. In FIGURE 6, the output binary 1 is recirculated back into CR. The register configurations at the end of time $t_1$ are shown in part (b) of Table 11, where it is seen that bit $d_{11}$ has been shifted out of FR0 to the utilization circuit.

At the commencement of time $t_2$ of the thirty-second read period, bits $d_{12}$, $d_{22}$, $d_{32}$, 0, and 1 are present at the output of the frame and control registers. The 0 and 1 bits from FR3 and CR, respectively, perform the same function during time $t_2$ that they performed during time $t_1$. That is bit $d_{42}$ is entered into FR2 while a 0 bit is entered into FR3. Bit $d_{32}$ is entered from FR2 into FR1, and bit $d_{22}$ is shifted from FR1 into FR0. Bit $d_{12}$ is shifted from FR0 into the utilization circuit via gate 28. A binary 1 is also entered into position 8 of CR. Part (c) of Table 11 shows the register contents at the end of this $t_2$ period. At the start of $t_3$, the bits now emerging from the frame and control registers are $d_{13}$, $d_{23}$, 0, $1_{83}$ and 1. The low signal R4 at gate 22$_3$ again produces a low signal from gate 18$_3$. In similar fashion, bit $1_{83}$ from pulse former 11$_3$ is applied to gate 22$_2$ and makes high its output. This high output when applied to gate 18$_2$ makes its output low. The low outputs from gates 18$_3$ and 18$_2$ make high the outputs from respective gates 19$_3$ and 19$_2$ so as to prevent entry of the fourth information bit $d_{33}$ into either one of the registers FR2 or FR3. However, since the output from FR2 is a binary 0, the high R2 signal when applied to gate 22$_1$ makes it output low. Since the output from gate 21$_1$ is also negative at this time, the output of gate 18$_1$ becomes high which in turn makes low the output of 19$_1$. Consequently, all of the inputs to gate 26$_1$ are low, making its output high and consequently the output of gate 24$_1$ low. This in turn permits gate 16$_1$ to enter bit $d_{33}$ into frame register 1. At the same time, the now high signal from gate 25$_1$ places a 0 bit into position 8 of FR2 via gate 17$_2$, instead of allowing bit $1_{84}$ from FR3 to enter this position. The low SHIFT signal at gate 22$_0$ further permits bit $d_{23}$ at the output of FR1 to enter FR0. Bit $d_{13}$ from FR0 is directed into the utilization circuit. Part (d) of Table 11 shows the deskew registers at the end of the $t_3$ time period.

During $t_4$, the emergence of bits 0, $1_{84}$ and 1 from FR2, FR3, and CR, respectively, permit the next information bit $d_{34}$ to be placed into FR1. This operation is identical to that discussed in connection with $t_3$. At the beginning of time period $t_5$, bit values of 0, 1, and 1 again emerge from FR2, FR3, and CR in order to place bit $d_{35}$ into FR1. Part (e) of Table 11 shows the register contents at the end of $t_5$, where it is seen that another bit of the first Data frame, $d_{15}$, is placed into the utilization circuit during this time.

During time periods $t_6$, $t_7$, and $t_8$, channel 6, 7, and 8 bits of the second Data frame enter on the INFORMATION line and must be placed into FR0 where they will be collected with the other bits of the second Data frame now present therein, having been shifted to FR0 from FR1 during the preceding times $t_0$ through $t_5$ of the thirty-second read period. This is accomplished in the following manner. At the commencement of $t_6$, the following bits emerge from FR1, FR2, FR3 and CR: 0, $1_{76}$, $1_{86}$, and 1, respectively. These bit values make low the outputs from gates 18$_1$, 18$_2$, and 18$_3$ so that gate 26$_0$ produces a high output. Therefore, gate 16$_0$ is now conditioned to pass bit $d_{26}$ into the eighth position of FR0. Since the output of gate 24$_0$ is low, the high output from gate 25$_0$ forces a 0 bit value into FR1 instead of allowing bit $1_{76}$ to be shifted from FR2 into FR1. Bit $1_{86}$ from FR3, on the other hand, is allowed to pass through gate 22$_2$ into FR2 at this time. Furthermore, bit $d_{16}$ from FR0 passes to the utilization circuit (Part (f) of Table 11 shows the register configuration at the end of the $t_6$ time slot. At the beginning of each of the times $t_7$ and $t_8$, the bit values from FR1, FR2, FR3, and CR, are 0111, respectively. Therefore, gate 26$_0$ becomes high at each time to thereby enter bits $d_{27}$ and $d_{28}$ into FR0, as well as placing 0 values into FR1. Bits $1_{87}$ and $1_{88}$ are shifted from FR3 into FR2. The continued low signal R4 to gate 22$_3$ also places 1 bits into FR3. In addition, bits $d_{17}$ and $d_{18}$ are shifted from FR0 to the utilization circuit. The register configuration at the end of $t_8$ time is shown in part (g) of Table 11.

From part (g) of Table 11 it will be noted that at the conclusion of the thirty-second read period, there is still one bit $d_{10}$ of the first Data frame which has not yet been shifted to the utilization circuit. It will further be seen that at the conclusion of time $t_8$, the single binary 0 value in CR emerges from pulse former 32 of FIGURE 6 one pulse time later, which is $t_0$ of the next succeeding machine cycle. When this occurs, signal R4 becomes high in order to apply a high signal from gate 58 to the input of pulse former 57. However, there is a one pulse time delay through pulse former 157 so that the low SHIFT signal remains present just long enough for bit $d_{10}$ to be shifted from FR0. During this additional shift time, bit $d_{20}$ enters position 8 of FR0, bit $d_{30}$ goes into position 8 of FR1, and bit $d_{40}$ enters position 8 of FR2. The 0 bit emerging from CR also is applied to gate 22$_3$ as a high signal which in turn enters a 0 into position 8 of FR3. Thus, part (h) of Table 11 shows the register loop configuration one pulse time after termination of read period 32, wherein it is seen that all the bits of the first Data frame have been shifted out of FR0. In addition, it will be noted that FR0 now contains all nine reassembled bits of the second Data frame, FR1 contains six bits of the third Data frame, and FR2 contains three bits of the second Data frame. CR again contains all 1 bits since the high START SENTINEL signal to gate 35 maintains its output low no matter what the value of the bit emerging from pulse former 32.

Since the above detailed description makes clear the operation of each logical sub-combination of the deskew circuit, no further discussion of the example in FIGURE 3 need here be given. In succeeding read periods the simultaneous occurrence of a 0 from the output of FR3, a 1 from the output of CR, and a Data bit on the INFORMATION conductor indicates that FR0 contains a completely reassembled Data frame which must be shifted to the utilization circuit. Therefore, the Shift flip-flop in FIGURE 8 is set for nine time intervals in order to perform said shift on the completely reassembled Data frame and, during the same time, shift upwards the contents of the other frame registers. The Stop Pattern bits at the end of a record are read into the deskew registers following the last Data frame. However, these bits are not allowed to enter the utilization circuit due to the operation of other circuits not disclosed herein since they do not constitute any part of the present invention. For purposes of this discussion, the recording of a Stop Pattern merely permits generation of low Sprocket pulses to allow the deskew circuit to shift out all of the remaining reassembled Data frames.

In the four frame register embodiment as disclosed, an overskew condition occurs if the degree of tape skew is greater than four character frames. When more than four frames of skew occurs among the Data frames, this condition is detected by gate 64 in FIGURE 8 during the time that the Shift flip-flop is set. When the SHIFT signal is present and if the outputs of frame registers 1, 2, and 3 are all 1's for any of the time intervals during which shift lasts (except for the last time intervals), then this implies that there is at least one read channel which has not yet received a Data bit as compared to another channel which has received four Data bits. This condition can only occur if the degree of tape skew is greater than four Data frames. As an example, consider part (a) of Table 11. If the bit $d_{18}$ had not been previously read and placed into FR0, then position 7 of FR0 at the end of time $t_0$ would instead contain a 0 read-in spot, while the position 7 of FR1 at this time would contain a binary 1. When this configuration 111 from from FR1, FR2, and FR3 appears at the output of the frame registers at time $t_7$, gate 64 would be enabled to generate a high signal which in turn sets the Overflow flip-flop. This is the desired indication, inasmuch as the first Data frame is in the process of being shifted out to the utilization circuit minus its eighth channel bit. This incomplete Data frame would not be correct if tape bit $d_{18}$ is a binary 1. An output from the control register is also applied to gate 64 because at $t_8$ time (part (g) of Table 11) the bits appearing from FR1, FR2, and FR3 are all Data bits and conceivably may be all 1's. However, in this case overskew has not occurred and so the Overskew flip-flop should not be set. The binary 0 always appearing from the output of CR at this time prevents the enabling of gate 64.

It is also the case that all Start Pattern bits from each channel must be in the deskew circuit before any valid shift operation can occur, otherwise, overskew will have occurred. Gate 65 in FIGURE 8 is therefore provided and is responsible to the SET SHIFT signal, which initiates the shift operation, as well as to an indication from pulse former 39 that the Start Sentinel has not yet been detected in at least one of the tape channels.

As has previously been emphasized, the detailed description of the logic of the present invention has been simplified by assuming a regular skew configuration on the tape, as well as assuming that each successive time interval of a read period (each read period being one machine cycle time in duration) contains a frame bit. However, the circuitry actually operates in practice upon frame bits which can arrive during widely separated time intervals. Consequently, there are time intervals during which no frame bits arrive on the INFORMATION line. For these intervals, recirculation of the loops is performed so as not to disturb the channel significance of the bits with respect to one another. As an example, refer to part (a) of Table 8 which shows the appearance of Data bit $d_{10}$ on the INFORMATION line at time $t_0$ of some machine cycle. The previous description with reference to this table assumed that at the next immediately following time interval $t_1$ of the same machine cycle, bit $d_{11}$ appeared on the INFORMATION line also for entry into FR0. In practice, however, bit $d_{11}$ may not appear until time $t_1$ of the next following machine cycle, or even the cycle after that. However, in the meantime the content of FR0 recirculates so that bit $d_{11}$ upon arrival is still placed into this register directly behind bit $d_{10}$. This is due to the fact that the location of the 0 read-in spot at time $t_1$ determines both the frame register to which a bit should be sent, as well as its position therein relative to the other bits already present. Consequently, the provision of said read-in spots increases the versatility of the circuit since the Data bits in an incoming serial train did not occupy time intervals which are adjacent to one another. There can be, on the contrary, wide gaps time-wise between the bits without affecting their ultimate correct positioning within the appropriate frame register. The same is true for the initially appearing Start Pattern bits.

In summary it may therefore be said that the present invention provides means for receiving, on a single input conductor, a serial train of binary bits belonging to different data frames, said circuit reassembling the bits belonging to any given Data frame. This operation is to be contrasted with prior art where there is usually a separate input conductor for each of the tape channels being read and upon which appears bits only associated with said one channel. By use of "read-in spots" contained in the frame registers, each incoming bit, no matter in what machine cycle it occurs, is placed into the proper register and along with bits of the same given data frame. The preferred embodiment is also responsive to initially appearing Start Pattern bits for setting up the initial read-in spot configurations within the registers. However, it is emphasized that other means may be used to force in the read-in spot configurations if a tape record should commence immediately with Data frames. Furthermore, if a Start Pattern is employed, it can have fewer than 28 frames and need be comprised only of a number of frames (including the Start Sentinel) equal to $M+1$, where M is the number of frame registers. In addition, the Start Sentinel itself for each channel can have a configuration other than 011. The present invention also provides a shift operation of Data information so as to utilize only one of the frame registers as the output to the utilization circuit. Provision is made so that any Data bits appearing on the INFORMATION line during the one machine cycle shift period may be immediately inserted into the frame registers. However, this is not to say that in practice Data bits will always appear during a shift operation. This, of course, depends upon the skew configuration. On the other hand, in certain environments it may be desirable to have the utilization circuit individually sample each frame register as it receives a completed character. In this case, no shift between registers need be required, there instead being merely a "round robin" insertion of a read-in spot from the Mth register to the first register. Other modifications might involve the substitution of static frame and control registers having parallel read-in and read-out for the dynamic shift registers shown herein. It is also evident that the skew correcting circuit of the present invention may be utilized in other arts similar with, but not limited to the reading of information from tape or drum storage media. For example, the invention may find use in the field of multiplex communications or the like. Different environments might also permit the identification of information bit values without need for accompanying Sprocket bits, e.g., by sensing the direction of charge in potential. Consequently, it is therefore evident that many modifications might be made by persons skilled in the art without departing from the spirit of the invention as defined in the appended claims.

We claim:

1. A skew correcting circuit comprising:

(a) only one information channel means for receiving a single serial train of bits belonging to a plurality of Y data frames, where each said $y$th data frame is comprised of a serial group of N order bits each $n$th order bit of which is serially fed along said one information channel means and appears during a corresponding $n$th time interval of some one of a group of successive machine cycles each cycle consisting of N successive time intervals, with different $n$th order bits of the same $y$th data frame appearing during the same or different machine cycles depending upon the amount of skew and with any $n$th order bit of a $y$th data frame appearing prior ot the appearance of the corresponding $n$th order bit of the $y+1$th data frame;

(b) a group of M frame registers each connected with said one information channel means and each capable of holding a complete N bit data frame in N different order positions, each $n$th position being identified with a $n$th time interval; and (c) means enabled at the appearance of any $n$th order data bit of a $y$th data frame to enter said last named $n$th order data bit into the corresponding $n$th order position of a same $m$th frame register, said means further enabled at the subsequent appearance of any corresponding $n$th order data bit of the $y+1$th data frame to enter said last named $n$th order data bit into the corresponding $n$th order position of a same $m+1$th frame register such that there can be concurrent filling of different ones of said frame registers by entry therein of successively appearing corresponding $n$th order data bits one from each of different data frames.

2. A circuit according to claim 1 wherein each said frame register is comprised of a N bit shift register.

3. A circuit according to claim 1 wherein said last named means is responsive to a predetermined bit value in any $n$th order position of said $m$th frame register and the opposite bit value in the corresponding $n$th order position of each of the $m+1$th through Mth frame registers for entering any appearing $n$th order data bit into the said last named $n$th order position of said $m$th frame register as well as for entering said predetermined bit value into the corresponding $n$th order position of said $m+1$th frame register.

4. A skew correcting circuit comprising:

(a) only one information channel means for receiving a single serial train of bits belonging to a plurality of Y data frames, where each said $y$th data frame is comprised of a serial group of N ordered bits in each $n$th order bit of which is serially fed along said one information channel means and appears during a corresponding $n$th time interval of some one of a group of successive machine cycles each cycle consisting of N successive time intervals, with different $n$th order bits of the same $y$th data frame appearing during the same or different machine cycles depending upon the amount of skew and with any $n$th order bit of a $y$th data frame appearing prior to the appearance of the corresponding $n$th order bit of the $y+1$th data frame;

(b) a group of M frame registers each connected with said one information channel means and each capable of holding a complete N bit data frame in N different order positions, each $n$th position being identified with a $n$th time interval;

(c) first means enabled at the appearance of any $n$th order data bit of a $y$th data frame to enter said last named $n$th order data bit into the corresponding $n$th order position of a same $m$th frame register, said means further enabled at the subsequent appearance of any corresponding $n$th order data bit of the $y+1$th data frame to enter said last named $n$th order data bit into the corresponding $n$th order position of a same $m+1$th frame register such that there can be concurrent filling of different ones of said frame registers by entry therein of successively appearing corresponding $n$th order data bits one from each of different data frames; and (d) second means enabled, when said first means enters any $n$th order data bit into the Mth frame register, for thereafter transferring out the bit in each $n$th order position of the $m=1$ frame register to a utilization circuit, and for also transferring the bit from each $n$th order position of every other $m$th frame register into the corresponding $n$th order position of the $m-1$th frame register.

5. A circuit according to claim 4 wherein is further provided overskew detecting means operating during the enabling of said second means to thereby sample each $n$th order position, except that position corresponding to the Mth frame register $n$th order position into which said first means has entered a data bit, of all frame registers but the $m=1$ frame register for indicating the presence of said opposite bit value in each of any said sampled corresponding $n$th order positions.

6. A circuit according to claim 4 wherein said first means is responsive in the absence of the enabling of said second means to a predetermined bit value in any $n$th order position of said $m$th frame register and the opposite bit value in the corresponding $n$th order position of each of the $m+1$th through Mth frame registers for entering any appearing $n$th order data bit into the said last named $n$th order position of said $m$th frame register as well as for entering said predetermined bit value into the corresponding $n$th order position of said $m+1$th frame register, and said first means is responsive during the enabling of said second means to said predetermined bit value in any $n$th order position of said $m$th frame register and the opposite bit value in the corresponding $n$th order position of each of the $m+1$th through Mth frame registers for entering said appearing $n$th order data bit into the corresponding $n$th order position of the $m-1$th frame register as well as for entering said predetermined bit value into the corresponding $n$th order position of said $m$th frame register 7. A circuit according to claim 5 wherein said first means is responsive in the absence of the enabling of said second means to a predetermined bit value in any $n$th order position of said $m$th frame register and the opposite bit value in the corresponding $n$th order position of each of the $m+1$th through Mth frame registers for entering any appearing $n$th order data bit into the said last named $n$th order position of said $m$th frame register as well as for entering said predetermined bit value into the corresponding $n$th order position of said $m+1$th frame register, and said first means is responsive during the enabling of said second means to said predetermined bit value in any $n$th order position of said $m$th frame register and the opposite bit value in the corresponding $n$th order position of each of the $m+1$th through Mth frame registers for entering said appearing $n$th order data bit into the corresponding $n$th order position of the $m-1$ frame register as well as for entering said predetermined bit value into the corresponding $n$th order position of said $m$th frame register.

8. A skew correcting circuit comprising:

(a) only one information channel means for receiving a single serial train of bits belonging to a plurality of of Z start pattern frames and Y data frames, where each $z$th start pattern frame and each $y$th data frame is comprised of a serial group of N ordered bits each $n$th order bit of which is serially fed along said one information channel means and appears during a corresponding $n$th time interval of some one of a group of successive machine cycles each cycle consisting of N successive time intervals, with different $n$th order bits of the same $z$th start pattern frame or the same $y$th data frame appearing during the same or different machine cycles depending upon the amount of skew, and where all corresponding $n$th order bits of all Z start pattern frames appear prior to the appearance of the corresponding $n$th order bit of any data frame, with any $n$th order bit of a respective $z$th start pattern frame and $y$th data frame appearing prior to the appearance of the corresponding $n$th order bit of the $z+1$th start pattern frame and the $y+1$th data frame, respectively;

(b) a group of M frame registers each connected with said one information channel means and each capable of holding a complete N bit data frame in N different order positions, each $n$th position being identified with a $n$th time interval;

(c) first means enabled at the appearance of any $n$th order start pattern bit to enter said last named $n$th order start pattern bit into the corresponding $n$th order position of the Mth frame register and to transfer the bit from the corresponding $n$th order position of each $m$th frame register into the corresponding $n$th order position of the $m-1$th frame register, such that each of the successively appearing corresponding $n$th order start pattern bits, one from each of different start pattern frames, is entered first into the corresponding $n$th order position of the Mth frame register and from there is subsequently transferred sequentially through the corresponding $n$th order positions of the remaining frame registers into the corresponding $n$th order position of the $m=1$ frame register;

(d) detector means responsive, at least in part to a predetermined configuration of start pattern bits in any group of corresponding $n$th order positions of all said frame registers, for disabling said first means at the subsequent appearance of any corresponding $n$th order data bit; and (e) second means enabled by the operation of said detector means for entering any said last named corresponding $n$th order data bit of a $y$th data frame into the corresponding $n$th order position of a same mth frame register, said second means further enabled at the subsequent appearance of any corresponding nth order data bit of the y+1th data frame to enter said last named nth order data bit into the corresponding nth order position of a same m+1th frame register, such that successively appearing corresponding nth order data bits, one from each of different data frames, are entered into different frame registers.

9. A circuit according to claim 8 wherein said second means is responsive to a predetermined bit value in any nth order position of said mth frame register and the opposite bit value in the corresponding nth order position of each of the m+1th through Mth frame registers for entering any appearing corresponding nth order data bit into the said last named nth order position of said mth frame register, as well as for entering said predetermined bit value into the corresponding nth order position of said m+1th frame register.

10. A circuit according to claim 8 wherein the number M of frame registers is not greater than the number Z of start data frames.

11. A circuit according to claim 8 wherein the number M of frame registers is less than the number Z of start pattern frames.

12. A circuit according to claim 8 wherein each said frame register is comprised of a N bit shift register.

13. A skew correcting circuit comprising:

(a) only one information channel means for receiving a single serial train of bits belonging to a plurality of Z start pattern frames and Y data frames, where each zth start pattern frame and and each yth data frame is comprised of a serial group of N ordered bits each nth order bit of which is serially fed along said one information channel means and appears during a corresponding nth time interval of some one of a group of successive machine cycles each cycle consisting of N successive time intervals, with different nth order bits of the same zth start pattern frame or the same yth data frame appearing during the same or different machine cycles depending upon the amount of skew, and where all corresponding nth order bits of all Z start pattern frames appear prior to the appearance of the corresponding nth order bit of any data frame, with any nth order bit of a respective zth start pattern frame and yth data frame appearing prior to the appearance of the corresponding nth order bit of the z+1th start pattern frame and the y+1th data frame, respectively;

(b) a group of M frame registers each capable of holding a complete N bit data frame in N different order positions, each nth position being identified with a nth time interval;

(c) first means enabled at the appearance of any nth order start pattern bit to enter said last named nth order start pattern bit into the corresponding nth order position of the Mth frame register and to transfer the bit from the corresponding nth order position of each mth frame register into the corresponding nth order position of the m−1th frame register, such that each of the successively appearing corresponding nth order start pattern bits, one from each of different start pattern frames, is entered first into the corresponding nth order position of the Mth frame register and from there is subsequently transferred sequentially through the corresponding nth order positions of the remaining frame registers into the corresponding nth order position of the m=1 frame register;

(d) detector means responsive, at least in part to a predetermined configuration of start pattern bits in any group of corresponding nth order positions have all said frame registers, for disabling said first means at the subsequent appearance of any corresponding nth order data bit;

(e) second means enabled by the operation of said detector means for entering any said last named corresponding nth order data bit of a yth data frame into the corresponding nth order position of a same mth frame register, said second means further enabled at the subsequent appearance of any corresponding nth order data bit of the y+1th data frame to enter said last named nth order data bit into the corresponding nth order position of a same m+1th frame register, such that the successively appearing corresponding nth order data bits, one from each of different data frames, are entered into different frame registers; and (f) third means enabled, when said second means enters any nth order data bit into the Mth frame register for thereafter transferring out the bit in each nth order position of the m=1 frame register to a utilization circuit, and for also shifting the bit from each nth order position of every other mth frame register into the corresponding nth order position of the m−1th frame register.

14. A circuit according to claim 13 wherein said second means is responsive to a predetermined bit value in any nth order position of said mth frame register and the opposite bit value in the corresponding nth order position of each of the M+1th through Mth frame registers for entering any appearing corresponding nth order data bit into the said last named order position of said mth frame register, as well as for entering said predetermined bit value into the corresponding nth order position of said m+1th frame register.

15. A circuit according to claim 14 wherein is further provided overskew detecting means operating during the enabling of said third means to thereby sample each nth order position, except that position corresponding to the Mth frame register nth order position into which said first means has entered a data bit, of all frame registers but the m=1 frame register for indicating the presence of said opposite bit value in each of any said sampled corresponding nth order positions.

16. A circuit according to claim 13 wherein is further provided overskew detecting means operating during the enabling of said third means to thereby sample each order position, except that position corresponding to the Mth frame register nth order position into which said first means has entered a data bit, of all frame registers but the m=1 frame register for indicating the presence of said opposite bit value in each of any said sampled corresponding nth order positions.

17. A skew correcting circuit comprising:

(a) only one information channel means for receiving a first single serial train of bits belonging to a plurality of Y data frames and a sprocket channel means for receiving second single serial train of sprocket bits one for each of said data bits, where each yth data frame is comprised of a serial group of N ordered bits each nth order bit of which is serially fed along said one information channel means and which, together with its sprocket bit, simultaneously appear during the corresponding nth time interval of some one of a group of successive machine cycles each cycle consisting of N successive time intervals, with different nth order bits of the same yth data frame appearing during the same or different machine cycles depending upon the amount of skew, and with any nth order bit of a yth data frame appearing prior to the appearance of the corresponding nth order bit of the y+1th data frame;

(b) a group of M frame registers each connected with said one information channel means and each comprised of a N bit dynamic recirculating loop with a one machine cycle time delay between its input and output; and (c) means connected with said sprocket channel means and enabled, by a sprocket bit appearing during any nth time interval for responding to the occurrence of a first predetermined bit value at the output of any $m$th frame register and the opposite bit value at the output of each of the $m+1$th through Mth frame registers thereby to inhibit the recirculation of said $m$th and $m+1$th registers during said last named $n$th time interval and instead to apply the concurrently appearing $n$th order data bit to the input of said $m$th register and to apply said first predetermined bit value to the input of said $m+1$th register.

18. A skew correcting circuit comprising:

(a) only one information channel means for receiving a first single serial train of bits belonging to a plurality of Y data frames and a sprocket channel means for receiving second single serial train of sprocket bits one for each of said data bits, where each $y$th data frame is comprised of a serial group of N ordered bits each $n$th order bit of which is serially fed along said one information channel means and which, together with its sprocket bit, simultaneously appear during the corresponding $n$th time interval of some one of a group of successive machine cycles each cycle consisting of N successive time intervals, with different $n$th order bits of the same $y$th data frame appearing during the same or different machine cycles depending upon the amount of skew and with any $n$th order bit of a $y$th data frame appearing prior to the appearance of the corresponding $n$th order bit of the $y+1$th data frame;

(b) a group of M frame registers each connected with said one information channel means and each comprised of a N bit dynamic recirculating loop with a one machine cycle time delay between its input and output;

(c) first means connected with said sprocket channel means and enabled by a sprocket bit appearing during any $n$th time interval for responding to the occurrence of a first predetermined bit value at the output of any $m$th frame register and the opposite bit value at the output of each of the $m+1$th through Mth frame registers thereby to inhibit the recirculation of said $m$th and $m+1$th frame registers during said last named $n$th time interval and instead to apply the concurrently appearing $n$th order data bit to the input of said $m$th frame register and to apply said first predetermined bit value to the input of said $m+1$th register; and (d) second means enabled, when said first means applies any $n$th order data bit to the Mth frame register during some $n$th time interval, to inhibit the recirculation of each said frame register and instead connect the output of each $m$th register to the input of the $m-1$th register for N successive time intervals beginning with the time interval immediately following said last named $n$th time interval, such that the content of the $m=1$ frame register is shifted out to a utilization means and the content of each of remaining $m$th frame register is shifted to the $m-1$th frame register;

19. A circuit according to claim 18 wherein said first means, if enabled by a sprocket bit appearing at a $n$th time interval during which said second means is enabled, responds at said last named $n$th time interval to the occurrence of said first predetermined bit value at the output of any $m$th frame register and the opposite bit value at the output of each of the $m+1$th through Mth frame registers in order to inhibit the shift of frame register bits into the $m-1$th and $m$th frame registers during said last named $n$th time interval and instead to apply the concurrently appearing $n$th order data bit to the input of said $m-1$th register and to apply said first predetermined bit value to the input of said $m$th register.

20. A circuit according to claim 18 wherein said second means comprises in combination a control register consisting of a N bit dynamic recirculating loop with a one machine cycle time delay between its input and output, a bistable flip-flop circuit having set and reset inputs, said flip-flop circuit being connected to condition shift gates between the output of each $m$th register and the input of the $m-1$th register, means responsive to said first means for setting said flip-flop to thereby initiate shift and at the same time for inserting a particular bit value into said control register, and means responsive to the emergence of said particular bit value from said control register for resetting said flip-flop.

21. A circuit according to claim 18 wherein is provided third means enabled during the enabling of said second means, except during the last time interval of the shift, to indicate the simultaneous occurrence of the said opposite bit value at each output of all of the frame registers, except $m=1$.

22. A circuit according to claim 21 wherein said first means, if enabled by a sprocket bit appearing at a $n$th time interval during which said second means is enabled, responds at said last named $n$th time interval to the occurrence of said first predetermined bit value at the output of any $m$th frame register and the opposite bit value at the output of each of the $m+1$th through Mth frame registers in order to inhibit the shift of frame register bits into the $m-1$th and $n$th frame registers during said last named $n$th time interval and instead to apply the concurrently appearing $n$th order data bit to the input of said $m-1$th frame register and to apply said first predetermined bit value to the input of said $m$th frame register.

23. A skew correcting circuit comprising:

(a) only one information channel means for receiving a first single serial train of bits belonging to a plurality of Z start pattern frames and Y data frames, and a sprocket channel means for receiving second single serial train of sprocket bits one for each of said start pattern bits and data bits, where each $z$th start pattern frame and $y$th data frame is comprised of a serial group of N ordered bits each $n$th order bit of which is serially fed along said one information channel means and which, together with its sprocket bit, simultaneously appear during a corresponding $n$th time interval of some one of a group of successive machine cycles each cycle consisting of N successive time intervals, with different $n$th order bits of the same $z$th start pattern frame or the same $y$th data frame appearing during the same or different machine cycles depending upon the amount of skew and where all corresponding $n$th order bits of all Z start pattern frames appear prior to the appearance of the corresponding $n$th order bits of any data frame, with any $n$th order bit of a respective $z$th start pattern frame and $y$th data frame appearing prior to the appearance of the corresponding order bit of the $z+1$th start pattern frame and the $y+1$th data frame, respectively;

(b) a group of M frame registers each connected with said one information channel means and each comprised of a N bit dynamic recirculating loop with a one machine cycle time delay between its input and output;

(c) set-up means connected with said sprocket channel means and enabled by start pattern sprocket bits for entering start pattern bits into said frame registers, said set up means further being responsive to a predetermined start pattern bit configuration in said frame registers for eventually applying during some $n$th time interval a first predetermined bit value to the input of the $m=1$ frame register and the opposite bit value to the input of the $m=2$ frame register; and (d) first means connected with said sprocket channel means and by any data sprocket bit appearing for responding to the occurrence of a said first predetermined bit value at the output of any $m$th frame register and the opposite bit value at the output of each of the $m+1$th through Mth frame registers thereby to inhibit the recirculation of said $m$th and $m+1$th registers during said last named $n$th time interval and instead to apply the concurrently appearing $n$th order data bit to the input of said $m$th register and to apply said first predetermined bit value to the input of said $m+1$th register.

24. A circuit according to claim 23 wherein said set-up means is enabled by any start pattern sprocket bit appearing during its $n$th time interval to inhibit the recirculation of each frame register during said last named $n$th time interval and instead to apply the concurrently appearing $n$th order start pattern bit to the input of the Mth frame register and to transfer the output of each $m$th frame register to the input of the $m-1$th frame register.

25. A circuit according to claim 24 wherein said set-up detector means includes means enabled by a start pattern, sprocket bit and at least in part by concurrence of a particular start pattern bit code configuration at the outputs of all of said frame registers thereby to apply said first predetermined bit value to the input of said $m=1$ frame register and the opposite bit value to the input of said $m=2$ frame register.

26. A skew correcting circuit comprising:

(a) only one information channel means for receiving a first single serial train of bits belonging to a plurality of Z start pattern frames and Y data frames, and a sprocket channel means for receiving second single serial train of sprocket bits one for each of said start pattern bits and data bits, where each $z$th start pattern frame and $y$th data frame is comprised of a serial group of N ordered bits the each $n$th order bit of which is serially fed along said one information channel means and which together with its sprocket bit, simultaneously appear during a corresponding $n$th time interval of some one of a group of successive machine cycles each cycle consisting of N successive time intervals, with different $n$th order bits of the same $z$th start pattern frame or the same $y$th data frame appearing during the same or different machine cycles depending upon the amount of skew and where all corresponding $n$th order bits of all Z start pattern frames appear prior to the corresponding $n$th order bit of any data frame, with any $n$th order bit of a respective $z$th start pattern frame and $y$th data frame appearing prior to the appearance of the corresponding $n$th order bit of the $z+1$th start pattern frame and the $y+1$th data frame, respectively;

(b) a group of N frame registers each connected with said one information channel means and each comprised of a N bit dynamic recirculating loop with a one machine cycle time delay between its input and output;

(c) set-up means connected with said one information channel means and each enabled by start pattern sprocket bits for entering start pattern bits into said frame registers, said set-up means further being responsive to a predetermined start pattern bit configuration in said frame registers for eventually applying during some $n$th time interval a first predetermined bit value to the input of the $m=1$ frame register and the opposite bit value to the input of the $m=2$ frame register;

(d) first means connected with said sprocket channel means and enabled by any data sprocket bit appearing during a $n$th time interval for responding to the occurrence of a said first predetermined bit value at the output of any $m$th frame register and the opposite bit value at the output of each of the $m+1$th through Mth frame registers thereby to inhibit the recirculation of said $m$th and $m+1$th registers during last named said $n$th time interval and instead to apply the concurrently appearing $n$th order data bit to the input of said $m$th register and to apply said predetermined bit value to the input of said $m+1$th register; and (e) second means enabled, when said first means applies any $n$th order data bit to the Mth frame register during some $n$th time interval, to inhibit the recirculation of each said frame register and instead connect the output of each $m$th register to the input of the $m-1$the register for N successive time intervals beginning with the time interval immediately following said last named $n$th time interval, such that the content of the $m=1$ frame register is shifted to a utilization means and the content of each remaining $m$th frame register is shifted to the $m-1$th frame register.

27. A circuit according to claim 26 wherein said first means, if enabled by a sprocket bit appearing at a $n$th time interval during which said second means is enabled, responds at said last named $n$th time interval to the occurrence of said first predetermined bit value at the output of any $m$th frame register and the opposite bit value at the output of each of the $m+1$th through Mth frame registers in order to inhibit the shift of frame register bits into the $m-1$th and $m$th frame registers during said last named $n$th time interval and instead to apply the concurrently appearing $n$th order data bit to the input of said $m-1$th register and to apply said first predetermined bit value to the input of said $m$th register.

28. A skew correcting circuit comprising:

(a) only one information channel means for receiving a first single serial train of bits belonging to a plurality of Z start pattern frames and Y data frames, and a sprocket channel means for receiving second single serial train of sprocket bits one for each of said start pattern bits and data bits, where each $z$th start pattern frame and $y$th data frame is comprised of a serial group of N ordered bits each $n$th order bit of which is serially fed along said one information channel means and which, together with its sprocket bit, simultaneously appear during a corresponding $n$th time interval of some one of a group of successive machine cycles each cycle consisting of N successive time intervals, with different $n$th order bits of the same $z$th start pattern frame or $y$th data frame appearing during the same or different machine cycles depending upon the amount of skew, and where all corresponding $n$th order bits of all Z start pattern frames appear prior to the appearance of the corresponding $n$th order bits of any data frame, with any $n$th order bit of a respective $z$th start pattern frame and $y$th data frame appearing prior to the appearance of the corresponding $n$th order bit of the $z+1$th start pattern frame and the $y+1$th data frame, respectively;

(b) a group of M frame registers each connected with said one information channel means and each comprised of a N bit dynamic recirculating loop with a one machine cycle time delay between its input and output;

(c) a control register comprised of a N bit dynamic recirculating loop with a one machine cycle time delay between its input and output;

(d) first sensing means connected with said sprocket channel means and responsive during any $n$th time interval to a first predetermined bit value appearing from the output of said control register and to an appearing sprocket bit for inhibiting the recirculation of each said frame register and instead applying a then appearing $n$th order start pattern bit to the input of the Mth frame register while transferring the output of each $m$th frame register to the input of the $m-1$th frame register;

(e) second sensing means connected with said sprocket channel means and responsive during any $n$th time interval to a said first predetermined bit value appearing from the output of said control register, to an appearing sprocket bit, to the then appearing start pattern bit, and to the occurrence of a particular start pattern bit code configuration at the outputs of all of said frame registers for applying said first predetermined bit value to the input of the $m=1$ frame register, and applying the opposite bit value to the input of the $m=2$ frame register and to the input of said control register;

(f) third sensing means enabled during any $n$th time interval to a said opposite bit value appearing from the output of said control register, to the occurrence of said first predetermined bit value at the output of any $m$th frame register, and to the occurrence of said opposite bit value at the output of each of the $m+1$th through Mth frame registers thereby to inhibit the recirculation of said $m$th and $m+1$th frame registers during said last named time interval and instead to apply a then appearing $n$th order data bit to the input of said $m$th frame register and to apply said first predetermined bit value to the input of said $m+1$th frame register.

References Cited by the Examiner

UNITED STATES PATENTS

| | | | |
|---|---|---|---|
| Re. 25,405 | 6/1963 | Witt et al. | 340—174.1 |
| 2,894,684 | 7/1958 | Nettleton | 235—153 X |
| 2,897,480 | 7/1959 | Kumagai | 235—153 X |
| 2,921,296 | 1/1960 | Floros | 340—172.5 |
| 3,027,542 | 3/1962 | Silva | 340—146.1 X |
| 3,046,523 | 7/1962 | Bately | 235—153 X |
| 3,154,762 | 10/1964 | Morphet | 340—172.5 |

ROBERT C. BAILEY, *Primary Examiner.*

MALCOLM A. MORRISON, *Examiner.*